United States Patent
Fan et al.

(10) Patent No.: US 10,542,473 B2
(45) Date of Patent: Jan. 21, 2020

(54) WIRELESS COMMUNICATION SYSTEM, A WIRELESS DEVICE, NETWORK NODES, AND METHODS THEREIN, FOR CHANGING MASTER NODE FOR THE WIRELESS DEVICE

(71) Applicant: Telefonaktiebolaget LM Ericsson (publ), Stockholm (SE)

(72) Inventors: Rui Fan, Beijing (CN); Qingyu Miao, Beijing (CN); Stefan Wager, Espoo (FI); Osman Nuri Can Yilmaz, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/774,742

(22) PCT Filed: Nov. 18, 2015

(86) PCT No.: PCT/SE2015/051239
§ 371 (c)(1),
(2) Date: May 9, 2018

(87) PCT Pub. No.: WO2017/086845
PCT Pub. Date: May 26, 2017

(65) Prior Publication Data
US 2018/0332657 A1    Nov. 15, 2018

(51) Int. Cl.
*H04W 36/18* (2009.01)
*H04W 36/00* (2009.01)
(Continued)

(52) U.S. Cl.
CPC ....... *H04W 36/18* (2013.01); *H04W 36/0033* (2013.01); *H04W 36/08* (2013.01);
(Continued)

(58) Field of Classification Search
CPC . H04W 84/20; H04W 36/0033; H04W 36/08; H04W 36/18; H04W 36/38;
(Continued)

(56) References Cited

U.S. PATENT DOCUMENTS

2013/0170474 A1    7/2013    Bi et al.
2015/0111580 A1    4/2015    Wu
(Continued)

FOREIGN PATENT DOCUMENTS

CN    104378793 A    2/2015
EP    2836017 A1    2/2015
(Continued)

OTHER PUBLICATIONS

International Search Report and Written Opinion of the International Searching Authority, PCT/SE2015/051239, dated Sep. 5, 2016, 17pages.
(Continued)

*Primary Examiner* — Joshua Kading
(74) *Attorney, Agent, or Firm* — Sage Patent Group

(57) ABSTRACT

A method performed in a wireless communications system for changing master node for a wireless device (WD). A first node is the master node for the WD, and second and third nodes are secondary nodes for the WD. The third node receives information that the third node is to be the master node and information to reuse a first set of existing protocol entities and context for communication with the WD. The WD receives information about a change of master node from the first node to the third node and information to reuse a second set of existing protocol entities and context for communication with the third node. The second node receives information that the third node is the master node and information to reuse a third set of existing protocol entities and context (Continued)

entities and context for communication with the WD. Thereby the master node for the WD is changed.

22 Claims, 17 Drawing Sheets

(51) Int. Cl.
| | |
|---|---|
| *H04W 36/08* | (2009.01) |
| *H04W 36/38* | (2009.01) |
| *H04W 76/15* | (2018.01) |
| *H04W 76/22* | (2018.01) |
| *H04W 36/30* | (2009.01) |
| *H04W 76/20* | (2018.01) |
| *H04L 1/16* | (2006.01) |
| *H04W 84/20* | (2009.01) |

(52) U.S. Cl.
CPC ......... *H04W 36/305* (2018.08); *H04W 36/38* (2013.01); *H04W 76/15* (2018.02); *H04W 76/22* (2018.02); *H04L 1/16* (2013.01); *H04W 76/20* (2018.02); *H04W 84/20* (2013.01)

(58) Field of Classification Search
CPC ........... H04W 36/305; H04W 36/0069; H04W 36/0005; H04W 36/0011; H04W 36/0016; H04W 36/0022; H04W 36/0027; H04W 36/0038; H04W 36/0044; H04W 36/0055; H04W 36/0061; H04W 36/0066; H04W 36/0079; H04W 36/16; H04W 36/20; H04W 36/22; H04W 36/30; H04W 76/15; H04W 76/22; H04W 76/20; H04W 76/18; H04W 76/19; H04L 1/16
See application file for complete search history.

(56) References Cited

U.S. PATENT DOCUMENTS

| | | | | |
|---|---|---|---|---|
| 2016/0191471 A1* | 6/2016 | Ryoo | ................... | H04W 12/04 455/411 |
| 2016/0192245 A1* | 6/2016 | He | ................... | H04W 36/0033 370/331 |
| 2017/0289879 A1* | 10/2017 | Wang | ................... | H04W 36/08 |

FOREIGN PATENT DOCUMENTS

| | | |
|---|---|---|
| EP | 2941071 A1 | 11/2015 |
| EP | 3035735 A1 | 6/2016 |
| WO | WO 2014/177090 A1 | 11/2014 |

OTHER PUBLICATIONS

International Preliminary Report on Patentability, PCT/SE2015/051239, dated Mar. 21, 2018, 11 pages.
"Vision and Schedule for 5G Radio Technologies," 3GPP RAN Workshop on 5G, Phoenix, AZ, USA, Sep. 17-18, 2015, Samsung, (RWS-150039), 19 pages.
"Evolved Universal Terrestrial Radio Access Network (E-UTRAN) Extension of Dual Connectivity in E-UTRAN (Release 13)," 3GPP TR 36.875 V13.1.0 (Sep. 2015) Draft_36875-d10, 37 pages.
Safjan, K., ed., "Architectural Aspects of MM-Wave Radio Access Integration With 5G Ecosystem," 5G PPP mmMagic, Version 1.0, Apr. 14, 2016, 17 pages.
"Remaining Issues on Security in Dual Connectivity," 3GPP TSG-RAN WG2 #88, Tdoc R2-145020, Nov. 17-21, 2014, Agenda Item 7.1.2.1, Ericsson, XP050877153, 4 pages.
Supplementary European Search Report and Written Opinion, EP 15908895.4, dated Jun. 4, 2019, 15 pages.
Communication from European Patent Office and Corrected Written Opinion, EP 15908895.4, dated Jun. 17, 2019, 10 Pages.
Catt, "Consideration of Optimized inter-MeNB handover", 3GPP TSG RAN WG3#87bis, Santa Cruz, Spain, Apr. 20-24, 2015, R3-150673, 5 Pages.
Kyocera Corp., "Analysis of FFSs for inter MeNB handover", 3GPP TSG RAN WG3 Meeting #87bis, Santa Cruz, Spain, Apr. 20-24, 2015, R3-150801, 7 Pages.

* cited by examiner

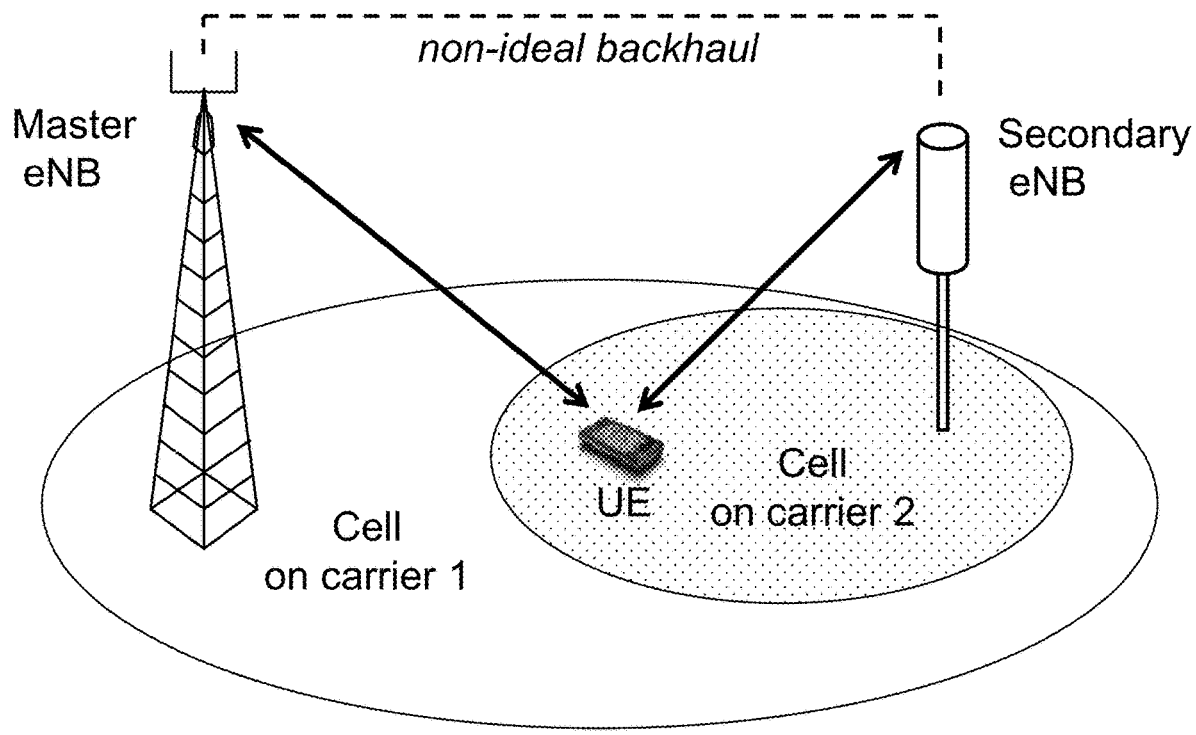
Figure 1 - Prior Art
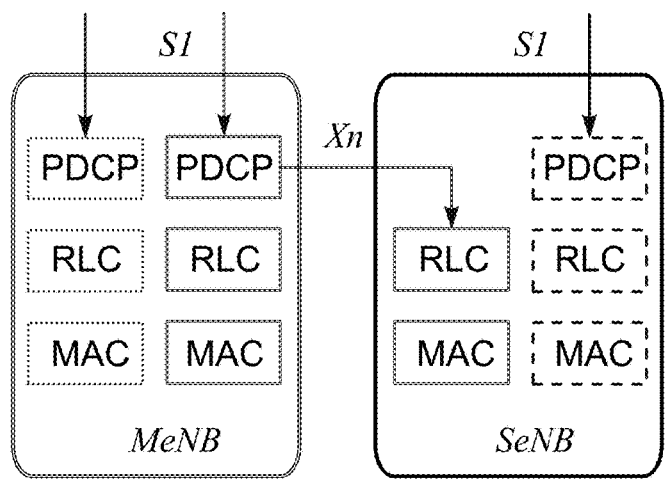
Figure 2 - Prior Art

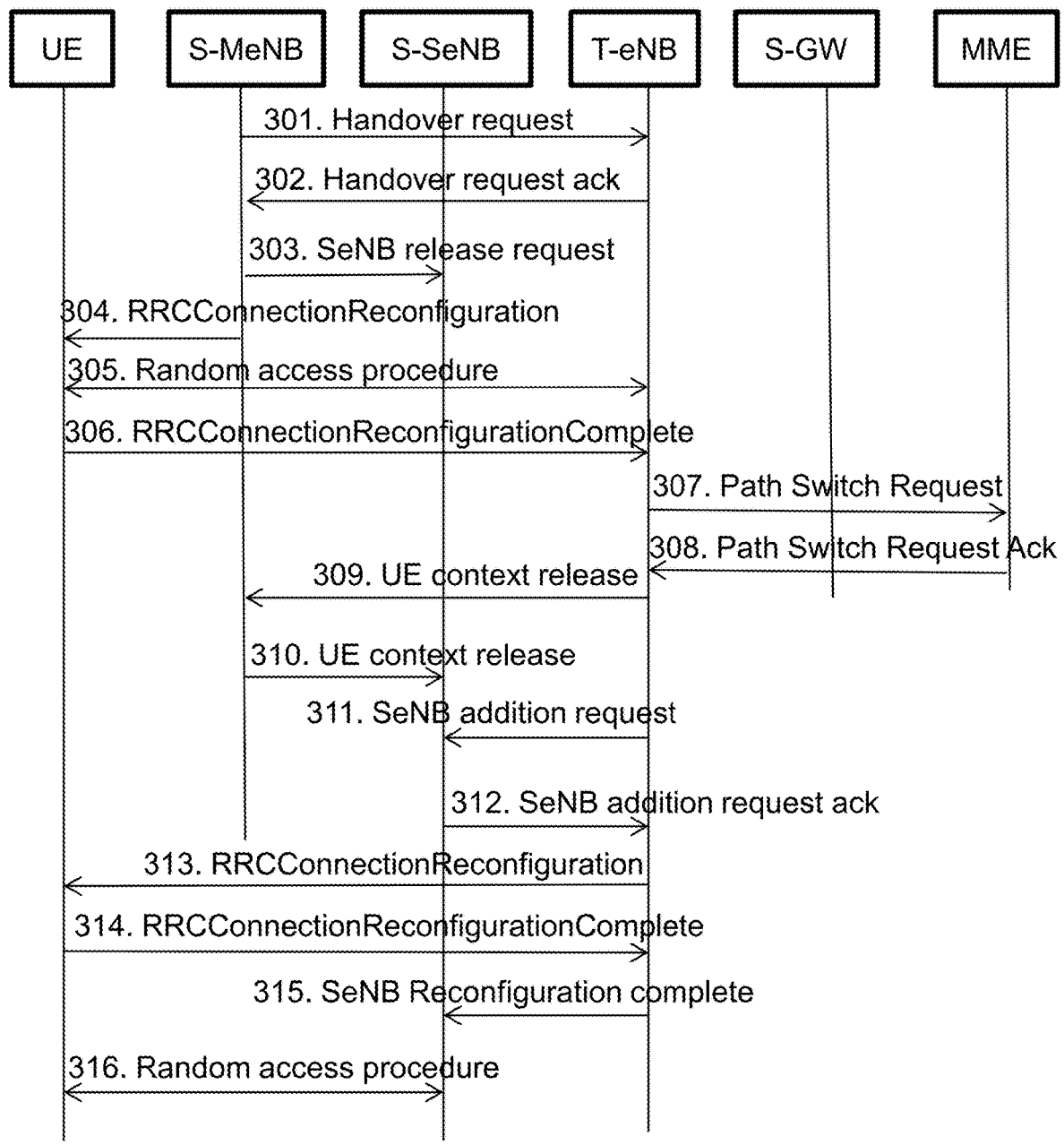
Figure 3 - Prior Art

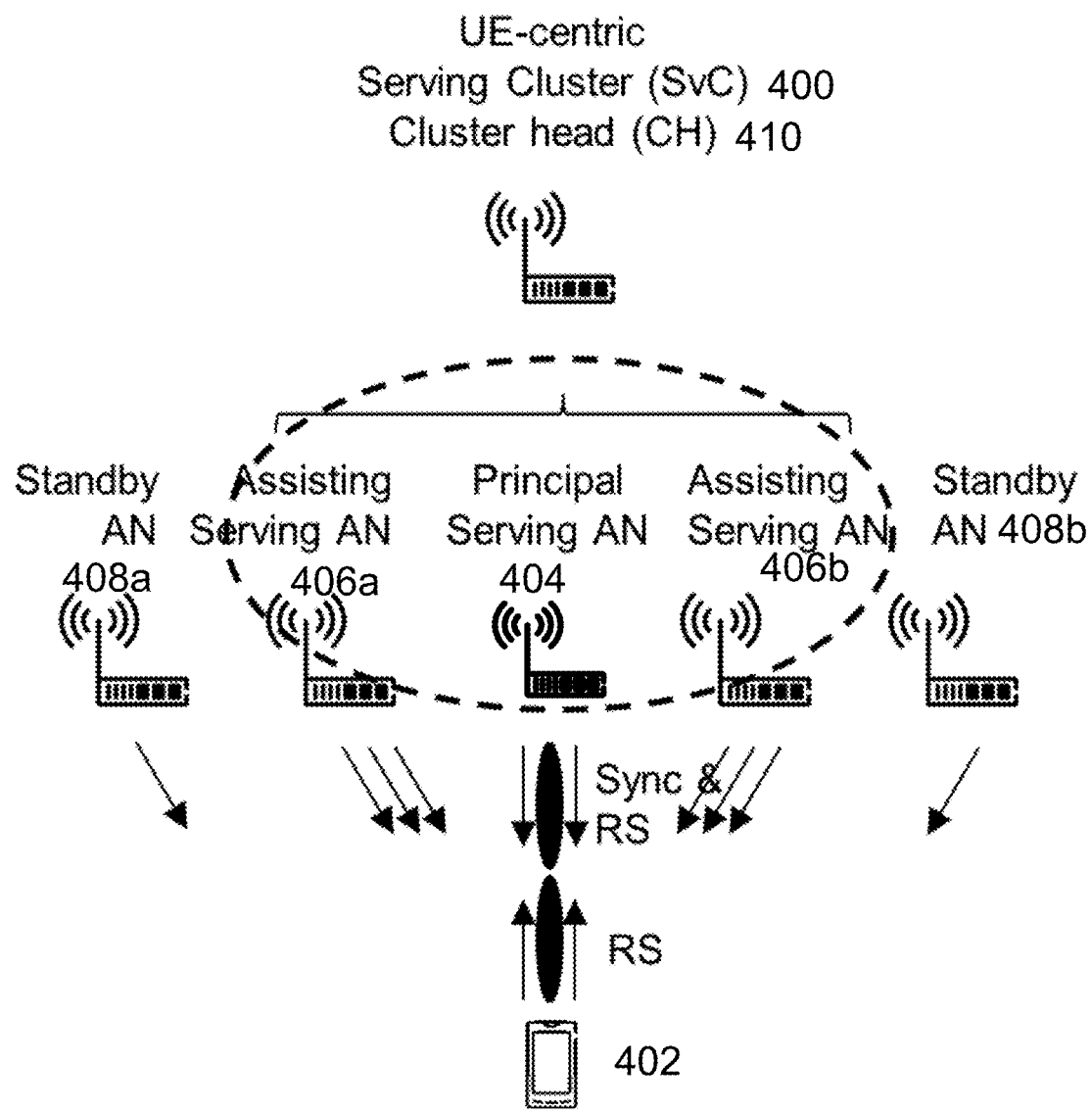
Figure 4 - Prior Art

Figure 7 Method performed by a wireless device 506

Figure 9 Method performed by 1st network node 508

Figure 11 Method performed by 2nd network node 510

Figure 13 Method performed by 3rd network node 512

US 10,542,473 B2

WIRELESS COMMUNICATION SYSTEM, A WIRELESS DEVICE, NETWORK NODES, AND METHODS THEREIN, FOR CHANGING MASTER NODE FOR THE WIRELESS DEVICE

CROSS REFERENCE TO RELATED APPLICATIONS

This application is a 35 U.S.C. § 371 national stage application of PCT International Application No. PCT/SE2015/051239 filed on Nov. 18, 2015, the disclosure and content of which is incorporated by reference herein in its entirety.

TECHNICAL FIELD

Embodiments herein relate to a wireless communications system, a wireless device, a first network node, a second network node, a third network node and to methods therein. Especially, embodiments herein relates to changing master node for the wireless device.

BACKGROUND

In the field of wireless communication, communication devices such as terminals or wireless devices are also known as e.g. User Equipments (UE), mobile terminals, wireless terminals and/or mobile stations. Such terminals are enabled to communicate wirelessly in a wireless communication system, such as a Wireless Local Area Network (WLAN), or a cellular communications network, sometimes also referred to as a cellular radio system or cellular networks. The communication may be performed e.g. between two terminals, between a terminal and a regular telephone, between a terminal and an Access Point/Access Node (AP/AN), and/or between a terminal and a server via an access network and possibly one or more core networks, comprised within the communications network.

The above terminals or wireless devices may further be referred to as mobile telephones, cellular telephones, laptops, or tablets with wireless capability, just to mention some further examples. The terminals or wireless devices in the present context may be, for example, portable, pocket-storable, hand-held, computer-comprised, or vehicle-mounted mobile devices, enabled to communicate voice and/or data, via the access network, such as a Radio Access Network (RAN), with another entity, such as another terminal or a server.

The communications network covers a geographical area which is divided into geographical subareas, such as coverage areas, cells or clusters. In a cellular communications network each cell area is served by an access node such as a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated at the base station site, may serve one or several cells. Further, each base station may support one or several communication technologies. The base stations communicate over the air interface operating on radio frequencies with the terminals or wireless devices within range of the base stations. In the context of this disclosure, the expression Downlink (DL) is used to denote the transmission path from the base station to the mobile station. The expression Uplink (UL) is used to denote the transmission path in the opposite direction i.e. from the mobile station to the base station.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic.

Dual Connectivity (DC) is a feature that has been standardized in 3GPP for LTE. In Dual connectivity, a user equipment (UE) can connect to two evolved Node Bs (eNBs) concurrently. One of the two eNBs, called a Master eNB (MeNB), is the signaling anchor point and the other one of the two eNBs, called a Secondary eNB (SeNB), is used to further increase user throughput. In DC, the frequency used by the MeNB and the SeNB, respectively, is assumed to be different. This is schematically illustrated in FIG. 1, wherein the UE is connected to the Master eNB on a first carrier carrier1 and to the Secondary eNB on a second carrier carrier2.

Further, in DC, there are three types of radio bearers; a Master Cell Group (MCG) bearer, a Secondary Cell Group (SCG) bearer and a Split bearer. The MCG bearer is a bearer served by the MeNB, the SCG bearer is a bearer served by the SeNB, and the Split bearer is a bearer served by both the MeNB and the SeNB. FIG. 2 schematically illustrates a combined protocol architecture according to the prior art, wherein the radio bearers between the PDCP, the RLC and the MAC layers to the left in the figure (dotted lines) are served by the MeNB, the radio bearers between the PDCP, the RLC and the MAC layers to the right in the figure (dashed lines) are served by the SeNB and the radio bearers between the PDCP, the RLC and the MAC layers in the middle are served by both the MeNB and the SeNB.

Further, in DC, when the MeNB needs to be changed to another eNB, whether it is the SeNB or another eNB, the signaling procedure, i.e. the steps 301-316, illustrated in FIG. 3 has to be followed. That is, the Serving SeNB (S-SeNB) needs to be released first, cf. step 303, then the UE attaches to the Target eNB (T-eNB), cf. steps 305-306, and thereafter the new SeNB, cf. steps 311-312, can be added.

The 5th generation mobile networks or 5th generation wireless systems (5G) is the next major phase of mobile telecommunications standards beyond the current 4G/IMT-Advanced standards.

The Next Generation Mobile Networks Alliance defines several requirements for the 5G communications networks. For example, should data rates of several tens of megabits per second be supported for tens of thousands of users. One (1) gigabit per second should be offered simultaneously to tens of workers on the same office floor. Several hundreds of thousands of simultaneous connections should be supported for massive sensor deployments. The spectral efficiency should be significantly enhanced as compared to 4G. The coverage should be improved, and the signalling efficiency should be enhanced. Further, should the latency be reduced significantly as compared to LTE. Furthermore, Critical Machine Type Communication (C-MTC) is also an important use cases in 5G, which has the ultra low latency requirement, and the latency requirement is usually tightly connected to very ultra-reliability requirements.

NeXt generation (NX) is envisioned to be a non-backward compatible system in 5G. In NX, the frequency range targeted includes 1 GHz up to 100 GHz. Especially due to the addition of high frequency spectrum to the wireless operation, high gain beamforming is a "must" to compensate the negative effects due to unfavorable radio propagation properties. One issue with high gain beamforming is that the serving beam is optimal only for a small area, and expectedly a small fraction of time. When the UE moves, the serving beam can deteriorate very fast which makes the mobility in NX a challenge. In order to solve this issue, a cluster concept is proposed for NX, where multiple access nodes can form a cluster to serve UE together. When the UE moves, if the beam from one access node deteriorates, other beams from other nodes can ensure that the UE can still be served and receive good performance. FIG. 4 schematically illustrates a cluster in an NX communications network. Especially, FIG. 4 schematically illustrates a UE-specific serving cluster 400, wherein a group of ANs that are located in the vicinity of a UE 402 are ready to serve the UE 402. In FIG. 4, the exemplifying group of ANs comprises a Principal Serving Access Node (P-SAN) 404 and two Assisting Serving Access Nodes (A-SANs) 406a, 406b. The P-SAN 404 is responsible for maintaining the connection between the severing cluster 400 and the UE 402, and it is intended to be the main serving AN for a given UE 402. Data blocks associated with the UE 402 are communicated directly through the P-SAN 404 most of the times. To control the fast beam switch, a cluster head 410 is needed for the coordination in the cluster 400. When the UE 402 moves, the standby AN 408a, 408b may also be added to the cluster 400. The standby AN 408a, 408b may be added as P-SAN or A-SAN.

However, it is a problem with current procedures for switching master node for the UE, such as the procedure according to FIG. 3 described above, that they are so time consuming whereby requirements on low latency cannot be fulfilled. Further, the signaling required for accomplishing the switching results in high usage of radio resources which may cause interference and deteriorate the performance in the communications network.

SUMMARY

An object of embodiments herein is to overcome the above-mentioned drawbacks among others and to improve the performance in a communications network.

According to a first aspect of embodiments herein, the object is achieved by a method performed in a wireless communications system for changing master node for a wireless device. The wireless device, a first network node, a second network node and a third network node are operating in the wireless communications system. The first network node is the master node for the wireless device, and the second network node and the third network node are secondary nodes for the wireless device.

The third network node receives a first signal, which first signal comprises information that the third network node is to be the master node for the wireless device and information to the third network node to reuse a first set of existing protocol entities and context for communication with the wireless device.

The wireless device receives a second signal, which second signal comprises information about a change of master node from the first network node to the third network node and information to the wireless device to reuse a second set of existing protocol entities and context for communication with the third network node.

The second network node receives a third signal which third signal comprises information that the third network node is the master node for the wireless device and information to the second network node to reuse a third set of existing protocol entities and context for communication with the wireless device.

Thereby the master node for the wireless device is changed.

According to a second aspect of embodiments herein, the object is achieved by a wireless communications system for changing master node for a wireless device. The wireless device, a first network node, a second network node and a third network node are operating in the wireless communications system. The first network node is the master node for the wireless device, and the second network node and the third network node are secondary nodes for the wireless device.

The third network node is configured to receive a first signal, which first signal comprises information that the third network node is to be the master node for the wireless device and information to the third network node to reuse a first set of existing protocol entities and context for communication with the wireless device.

The wireless device is configured to receive a second signal, which second signal comprises information about a change of master node from the first network node to the third network node and information to the wireless device to reuse a second set of existing protocol entities and context for communication with the third network node.

The second network node is configured to receive a third signal, which third signal comprises information that the third network node is the master node for the wireless device and information to the second network node to reuse a third set of existing protocol entities and context for communication with the wireless device, whereby the master node for the wireless device is changed.

According to a third aspect of embodiments herein, the object is achieved by a method performed by a method performed by a wireless device for changing master node for the wireless device. The wireless device, a first network node, a second network node and a third network node are operating in the wireless communications system. The first network node is the master node for the wireless device, and the second network node and the third network node are secondary nodes for the wireless device.

The wireless device receives a second signal, which second signal comprises information about a change of master node from the first network node to the third network node and information to the wireless device to reuse a second set of existing protocol entities and context for communication with the third network node.

According to a fourth aspect of embodiments herein, the object is achieved by a wireless device for changing master node for the wireless device. The wireless device, a first network node, a second network node and a third network node are operating in the wireless communications system. The first network node is the master node for the wireless device, and the second network node and the third network node are secondary nodes for the wireless device.

The wireless device is configured to receive a second signal, which second signal comprises information about a change of master node from the first network node to the third network node and information to the wireless device to reuse a second set of existing protocol entities and context for communication with the third network node.

According to a fifth aspect of embodiments herein, the object is achieved by a method performed by a method performed by a first network node for changing master node for a wireless device. The wireless device, a first network node, a second network node and a third network node are operating in the wireless communications system. The first network node is the master node for the wireless device, and the second network node and the third network node are secondary nodes for the wireless device.

The first network node transmits a first signal to the third network node, which first signal comprises information that the third network node is to be the master node for the wireless device and information to the third network node to reuse a first set of existing protocol entities and context for communication with the wireless device.

Further, the first network node transmits a second signal to the wireless device, which second signal comprises information about a change of master node from the first network node to the third network node and information to the wireless device to reuse a second set of existing protocol entities and context for communication with the third network node, whereby the master node for the wireless device is changed.

According to a sixth aspect of embodiments herein, the object is achieved by a first network node for changing master node for a wireless device, wherein the wireless device. The wireless device, a first network node, a second network node and a third network node are operating in the wireless communications system. The first network node is the master node for the wireless device, and the second network node and the third network node are secondary nodes for the wireless device.

The first network node is configured to transmit a first signal to the third network node, which first signal comprises information that the third network node is to be the master node for the wireless device and information to the third network node to reuse a first set of existing protocol entities and context for communication with the wireless device.

Further, the first network node is transmit a second signal to the wireless device, which second signal comprises information about a change of master node from the first network node to the third network node and information to the wireless device to reuse a second set of existing protocol entities and context for communication with the third network node, whereby the master node for the wireless device is changed.

According to a seventh aspect of embodiments herein, the object is achieved by a method performed by a second network node for assisting in changing master node for a wireless device. The wireless device, a first network node, a second network node and a third network node are operating in the wireless communications system. The first network node is the master node for the wireless device, and the second network node and the third network node are secondary nodes for the wireless device.

The second network node receives a third signal, which third signal comprises information that the third network node is the master node for the wireless device and information to the second network node to reuse a third set of existing protocol entities and context for communication with the wireless device, whereby the second network node assists in changing master node for the wireless device.

According to an eighth second aspect of embodiments herein, the object is achieved by a second network node for assisting in changing master node for a wireless device. The wireless device, a first network node, a second network node and a third network node are operating in the wireless communications system. The first network node is the master node for the wireless device, and the second network node and the third network node are secondary nodes for the wireless device.

The second network node is configured to receive a third signal, which third signal comprises information that the third network node is the master node for the wireless device and information to the second network node to reuse a third set of existing protocol entities and context for communication with the wireless device, whereby the second network node assists in changing master node for the wireless device.

According to a ninth aspect of embodiments herein, the object is achieved by a method performed a third network node for changing master node for a wireless device. The wireless device, a first network node, a second network node and a third network node are operating in the wireless communications system. The first network node is the master node for the wireless device, and the second network node and the third network node are secondary nodes for the wireless device.

The third network node receives a first signal, which first signal comprises information that the third network node is to be the master node for the wireless device and information to the third network node to reuse a first set of existing protocol entities and context for communication with the wireless device.

Further, the third network node transmits a second signal to the wireless device, which second signal comprises information about a change of master node from the first network node to the third network node and information to the wireless device to reuse a second set of existing protocol entities and context for communication with the third network node.

Furthermore, the third network node transmits a third signal to the second network node, which third signal comprises information that the third network node is the master node for the wireless device and information to the second network node to reuse a third set of existing protocol entities and context for communication with the wireless device, whereby the master node for the wireless device is changed.

According to a tenth aspect of embodiments herein, the object is achieved by a third network node for changing master node for a wireless device. The wireless device, a first network node, a second network node and a third network node are operating in the wireless communications system. The first network node is the master node for the wireless device, and the second network node and the third network node are secondary nodes for the wireless device.

The third network node is configured to receive a first signal, which first signal comprises information that the third network node is to be the master node for the wireless device and information to the third network node to reuse a first set of existing protocol entities and context for communication with the wireless device.

Further, the third network node is configured to transmit a second signal to the wireless device, which second signal comprises information about a change of master node from the first network node to the third network node and information to the wireless device to reuse a second set of existing protocol entities and context for communication with the third network node.

Furthermore, the third network node is configured to transmit a third signal to the second network node, which third signal comprises information that the third network node is the master node for the wireless device and information to the second network node to reuse a third set of existing protocol entities and context for communication with the wireless device, whereby the master node for the wireless device is changed.

According to an eleventh aspect of embodiments herein, the object is achieved by a computer program, comprising instructions which, when executed on at least one processor, causes the at least one processor to carry out the method performed by the wireless device.

According to a twelfth aspect of embodiments herein, the object is achieved by a computer program, comprising instructions which, when executed on at least one processor, causes the at least one processor to carry out the method performed by the first network node.

According to a thirteenth aspect of embodiments herein, the object is achieved by a computer program, comprising instructions which, when executed on at least one processor, causes the at least one processor to carry out the method performed by the 25 second network node.

According to a fourteenth aspect of embodiments herein, the object is achieved by a computer program, comprising instructions which, when executed on at least one processor, causes the at least one processor to carry out the method performed by the third network node.

According to a fifteenth aspect of embodiments herein, the object is achieved by a carrier comprising the computer program, wherein the carrier is one of an electronic signal, an optical signal, a radio signal or a computer readable storage medium.

Since the third network node receives a first signal, which first signal comprises information that the third network node is to be the master node for the wireless device and information to the third network node to reuse a first set of existing protocol entities and context for communication with the wireless device; since the wireless device receives a second signal, which second signal comprises information about a change of master node from the first network node to the third network node and information to the wireless device to reuse a second set of existing protocol entities and context for communication with the third network node; and since the second network node receives a third signal which third signal comprises information that the third network node is the master node for the wireless device and information to the second network node to reuse a third set of existing protocol entities and context for communication with the wireless device, already existing protocol entities and context for communication can be reused. Thereby, a fast role-switch from one master node to another is accomplished. This results in an improved performance in the communications network.

An advantage with embodiments herein is that a reduced signaling for role-switch is provided, which reduces the handover interruption time and avoids the radio link failure, resulting in an improved availability of the communications network and in a seamless mobility for the wireless device with low latency and high reliability. Thereby the requirements on a 5G communications network, especially the requirement for C-MTC is fulfilled.

By the expression "seamless mobility" when used in this disclosure is meant that the handover interruption time is short, e.g. that the handover interruption time is zero.

BRIEF DESCRIPTION OF DRAWINGS

Examples of embodiments herein will be described in more detail with reference to attached drawings in which:

FIG. 1 schematically illustrates dual connectivity in LTE;
FIG. 2 schematically illustrates a combined protocol architecture according to prior art;
FIG. 3 schematically illustrates the signaling procedure for change of master node according to prior art;
FIG. 4 schematically illustrates an exemplifying cluster in an NX communications network.

DETAILED DESCRIPTION

Figure 5:
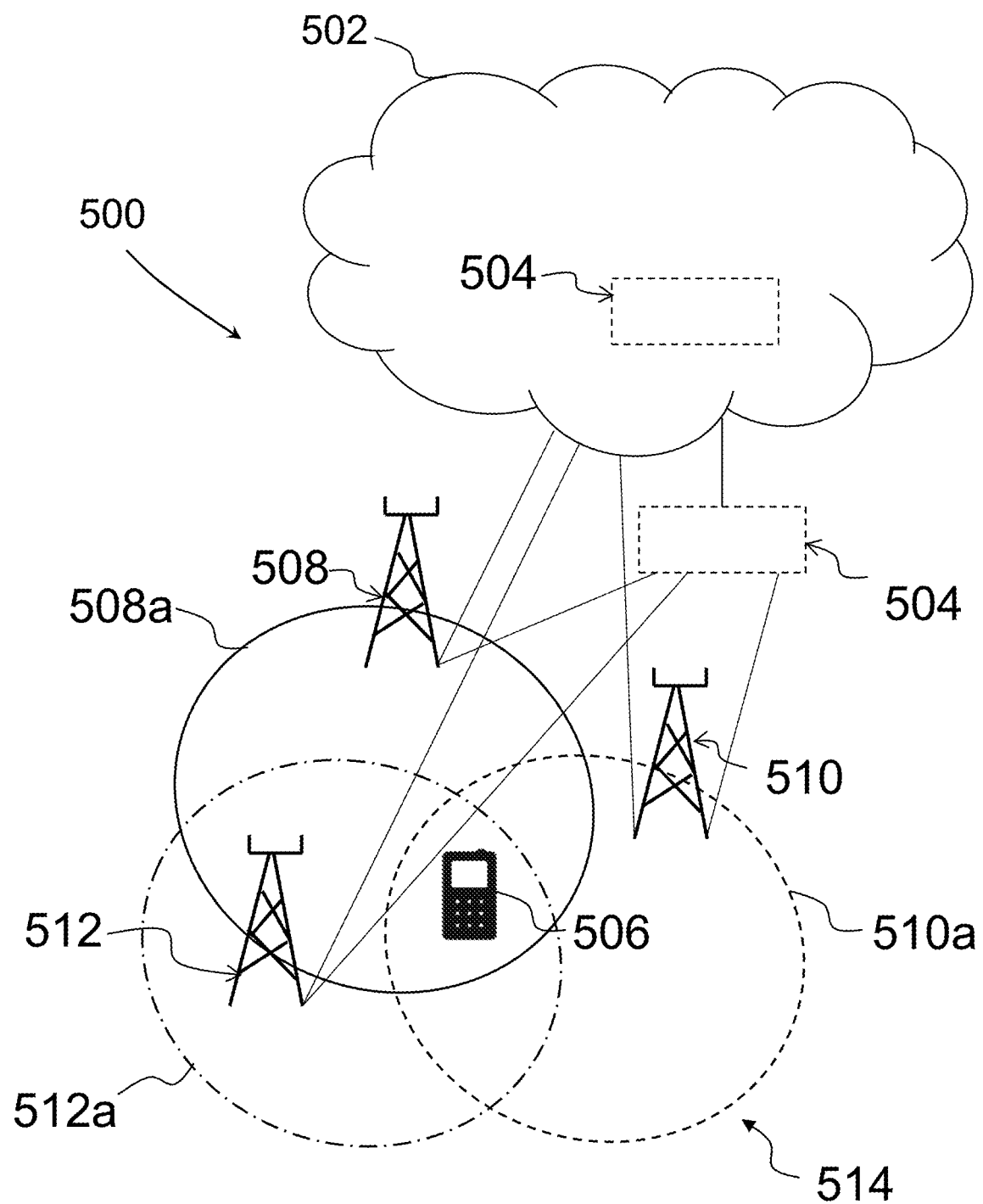
FIG. 5 schematically illustrates an embodiment of a communications network.

Some embodiments disclosed herein relate to the fifth generation (5G) of wireless communications networks, and especially to changing master node for a wireless device operating in the wireless communications network.

An aim of some embodiments herein is to provide for handling of connections in conjunction with multiple access nodes to enable a seamless and always-available operation. By the expression "seamless and always-available operation" when used in this disclosure is meant an operation with a short or no handover interruption time.

As part of developing embodiments herein, some problems with the state of the art communications networks will first be identified and discussed.

Currently it is not decided how to handle a role switch between network nodes operating in a future communications network, such as a 5G-NX communications network. For example, it is not decided how to handle a change of master node for a wireless device operating in the communications network. The change of master node from one node to another is sometimes in this disclosure referred to as a role-switch since there is a switch in roles between a first node acting as master node for the wireless device and a second node acting as a secondary node for the wireless device.

The seamless and always-available operation may be accomplished either for a) enabling a fast role-switch, i.e., when a secondary network node, e.g. a SeNB, is better than a master network node, e.g. a MeNB, and therefore should be the new master network node, or for b) guaranteeing a communications network availability, i.e., when the master network node, e.g. the MeNB, suddenly is out-of-service and the secondary network node, e.g. the SeNB, needs to be upgraded to be the master network node.

One straightforward solution is to follow the same principle as defined in LTE DC described above. During such as LTE DC procedure, the old members in the old cluster needs to be first released, after that the UE connects to the new MeNB and a new cluster can be set up with the new members included. By the expression "old members in the old cluster" is meant the master network node and the one or more secondary network nodes serving the wireless device before the role-switch. Further, by the expression "new members in the new cluster" is meant the master network node and the one or more secondary network nodes serving the wireless device after the role-switch. However, the LTE DC procedure described above is neither a signaling-efficient procedure nor a time-optimized procedure as too many signaling is involved in the role switch. Furthermore, if there is a disconnection, e.g. a connection failure, between the master node, e.g. the MeNB, and the wireless device, there may be even a longer delay to perform recovery from the secondary node, e.g. the SeNB, which is not acceptable for certain type of applications and/or services e.g., for a mission-critical Machine Type Communication (MTC). All in all, such as LTE DC procedure does not satisfy the requirement for 5G applications which may require fast role switch for Critical Machine Type Communication (C-MTC).

Therefore, some embodiments disclosed herein provide for a more efficient signaling procedure for handling of role-switch in a communications network. The role-switch may occur either when the master node, e.g. the MeNB, actively requires a secondary node, e.g. the SeNB, to take the role as master node; or when the master node, e.g. the MeNB, is associated with a failure and the secondary node, e.g. the SeNB, has to be upgraded to take the role as master node.

With the new signaling procedure, many entities, e.g. protocol entities, and context in the cluster are kept. Thereby, the signaling needed for accomplishing the role-switch is reduced. Thus, unnecessary signaling is avoided or reduced, whereby the role-switch procedure is accelerated which is beneficial in 5G scenarios where fast response and availability are needed.

Some embodiments disclosed herein provide for a new protocol architecture and a new signaling procedure that is designed to solve the role-switch or recovery issue in a connectivity cluster. By the expression "connectivity cluster" when used in this disclosure is meant a group of access nodes and/or connections that are located in the vicinity of a wireless device, e.g. a UE, and are ready to serve the wireless device. By embodiments described herein, the amount of signaling required is reduced and the role-switching procedure is expedited which is essential for a delay sensitive application and/or a delay sensitive service, such as mission-critical MTC.

Terminology

The following terminology is used in embodiments described herein and is elaborated below:

Network node: In some embodiments a more general term "network node" is used and it may correspond to any type of network node or radio network node, which communicates with a UE and/or with another network node. Examples of network nodes are User equipment (UE), NodeB, MeNB, SeNB, a network node belonging to a Master Cell Group (MCG) or a Secondary Cell Group (SCG), Base Station (BS), multi-Standard Radio (MSR) radio node such as MSR BS, eNodeB, network controller, radio Network Controller (RNC), Base Station Controller (BSC), relay, donor node controlling relay, Base Transceiver Station (BTS), Access Point (AP), transmission points, transmission nodes, Radio Remote Unit (RRU), Remote Radio Head (RRH), nodes in Distributed Antenna System (DAS), core network node (e.g. Mobile Switching Center (MSC), Mobility Management Entity (MME) etc), Operations and Maintenance (O&M), Operations Support System (OSS), Self-organizing Network (SON), positioning node (e.g. Enhanced Serving Mobile Location Center (E-SMLC)), Mobile Data Terminal (MDT) etc.

Communication Device/User Equipment/Wireless Device:

In some embodiments the non-limiting terms communications device, wireless device and User Equipment (UE) are used and they refer to any type of wireless device communicating with a network node or with another UE in a wireless, cellular or mobile communication system. Examples of communication device/UE/wireless device are Device-to-Device (D2D) UE, machine type UE or UE capable of machine to machine (M2M) communication, Personal Digital Assistant (PDA), Tablet, wireless terminal, mobile terminals, mobile phone, smart phone, Laptop Embedded Equipped (LEE), Laptop Mounted Equipment (LME), Universal Serial Bus (USB) dongles etc.

It should be noted that the term user equipment used in this document also covers other wireless devices such as Machine to Machine (M2M) devices, even though they are not handled by any user.

Further, in this disclosure the terms communications device, wireless device and UE are used interchangeably.

General

Note that although terminology from 3GPP LTE has been used in this disclosure to exemplify embodiments, this should not be seen as limiting the scope of the invention to only the aforementioned system. Other wireless systems, including Wideband Code Division Multiple Access (WCDMA), High Speed Packet Access (HSPA), Worldwide Interoperability for Microwave Access (WiMax), WiFi, Wireless Local Area Network (WLAN), IEEE802.11 system and Global System for Mobile Communications (GSM)/ GSM EDGE Radio Access Network (GERAN), may also benefit from exploiting the ideas covered within this disclosure.

Also note that terminology such as eNodeB and UE should be considering non-limiting and does in particular not imply a certain hierarchical relation between the two; in general "eNodeB" could be considered as device 1 and "UE" device 2, and these two devices communicate with each other over some radio channel.

Further, the description frequently refers to wireless transmissions in the downlink, but embodiments herein are equally applicable in the uplink.

Furthermore, by the expression "protocol layer entity" when used herein is meant a Packet Data Convergence Protocol (PDCP) entity, a Radio Link Control (RLC) entity, Media Access Control (MAC) entity, or another protocol layer entity.

In the following section, embodiments herein will be illustrated in more detail by various exemplary embodiments. It should be noted that these embodiments are not mutually exclusive. Components from one embodiment may be assumed to be present in another embodiment and it will be obvious to a person skilled in the art how those components may be used in the other exemplary embodiments.

FIG. 5 depicts an example of a communications network 500 in which embodiments herein may be implemented. The communications network 500 is a wireless communication network such as an NX network, an LTE network, a WCDMA network, a GSM network, any 3GPP cellular network, WiMAX network, any other wireless network, or a combination of one or more of the aforementioned communications networks.

A Radio Access Network (RAN) 501 may be comprised in the communications network 500. The RAN 501 may be an NX access network, an LTE access network, a WCDMA access network, a GSM access network, any 3GPP cellular access network, WiMAX access network, any other wireless access network, or a combination of one or more of the aforementioned access networks.

A core network 502 may be comprised in the communications network 500. The core network 502 may be an NX core network, an LTE Core network, e.g. a System Architecture Evolution (SAE) network, a WCDMA core network, an GSM core network, any 3GPP cellular core network, a Wimax core network, any other wireless core network, or a combination of one or more of the aforementioned core networks.

A core network node 504 may be comprised in or connected to the core network 503. The core network node 504 may be an NX core network node, an LTE core network node, a WCDMA core network node, an GSM core network node, any 3GPP cellular core network node, a Wimax core network node, or any other core network node.

A communications device, such as a wireless device 506 may be comprised in the communications network 500. The wireless device 506 is configured to operate in the communications network 500. In other words, the wireless device 506 is operable in the communications network 500.

Further, in this disclosure, the terms communications device, wireless device, UE and similar are used interchangeably.

A first network node 508 may be comprised in the communications network 500. The first network node 508 is configured to operate in the communications network 500. In other words, the first network node 508 is operable in the communications network 500.

A first geographical area 508a is served by the first network node 508. Further, the wireless device 506 is configured to communicate with the first network node 508 when located in the first geographical area 508a. The geographical area may be a wide area or a beam.

A second network node 510 may be comprised in the communications network 500. The second network node 510 is configured to operate in the communications network 500. In other words, the second network node 510 is operable in the communications network 500.

A second geographical area 510a is served by the second network node 510. Further, the wireless device 506 is configured to communicate with the second network node 510 when located in the first geographical area 510a.

A third network node 512 may be comprised in the communications network 500. The third network node 512 is configured to operate in the communications network 500. In other words, the third network node 512 is operable in the communications network 500.

A third geographical area 512a is served by the third network node 512. Further, the wireless device 506 is configured to communicate with the third network node 512 when located in the third geographical area 512a.

Sometimes herein the first, second and third geographical areas 508a, 510a, 512a are referred to as a cluster 514. In such case, one or more of the first, second and third network nodes 508, 510, 512 located in the vicinity of the wireless device 506 and ready to serve the wireless device 506 are said to be comprised in or belonging to the cluster 514.

Figure 6:
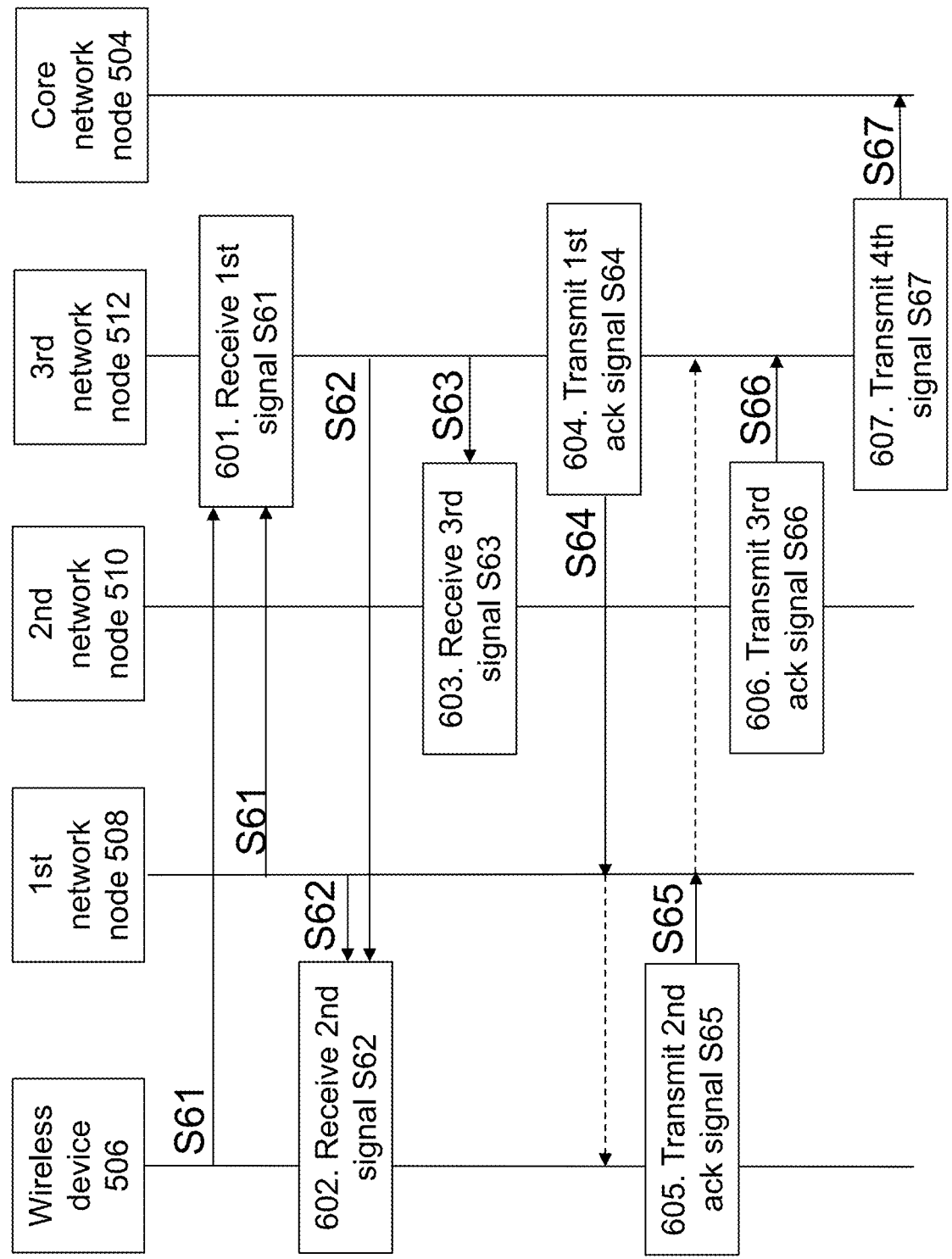
FIG. 6 is a combined flowchart and block diagram illustrating embodiments of a method performed in the communications network.

An example of a method performed in the communications network 500 for changing master node for the wireless device 506 will now be described with reference to the combined flowchart and block diagram illustrated in FIG. 6. As mentioned above, the wireless device 506, the first network node 508, the second network node 510 and the third network node 512 are operating in the wireless communications system 500. Further, the first network node 508 is the master node for the wireless device 506, and the second network node 510 and the third network node 512 are secondary nodes for the wireless device 506.

Action 601

In order to inform the third network node 512 that it is to be the new master node for the wireless device 506, the third network node 512 receives a first signal S61. As illustrated in FIG. 6, the first signal S61 may be transmitted from the wireless device 506 or the first network node 508. The first signal S61 may be transmitted from the wireless device 506 when the wireless device 506 has detected a connection failure with the existing master node, e.g., with the first network node 508. Alternatively, the signal S61 may be transmitted from the first network node 508 acting as the master node, when the first network node 508 has detected that the third network node 512 would be a better master node than the first network node 508. By the expression "better master node" is meant a network node providing an improved communication quality for the wireless device 506.

The first signal S61 comprises information that the third network node 512 is to be the master node for the wireless device 506 and information to the third network node 512 to reuse a first set of existing protocol entities and context for communication with the wireless device 506. Thus, the first signal S61 instructions the third network node 512 to be the master node and to reuse already existing protocol entities and context for communication with the wireless device 506.

The existing protocol entities comprise one or more Radio Link Control (RLC) entities and/or one or more Medium Access Control (MAC) entities, and wherein the context comprises one or more of: state information such as a Radio Resource Control (RRC) state; security-related information such as a security capability or a security key; a UE identity such as an identity of a UE-associated logical S1-connection; and a UE radio access capability.

Thus, the first set of existing protocol entities and context for communication with the wireless device 506 may comprise one or more of the protocol entities and context mentioned above and already existing and/or established for communicating with the wireless device 506. For example, the first set of existing protocol entities and context for communication with the wireless device 506 may comprise the RLC entity and the security key, etc.

Action 602

In order to inform the wireless device 506 about a change of master node, the wireless device 506 receives a second signal S62. As illustrated in FIG. 6, the second signal S62 may be transmitted from the first network node 508 or from the third network node 512.

The second signal S62 comprises information about a change of master node from the first network node 508 to the third network node 512 and information to the wireless device 506 to reuse a second set of existing protocol entities and context for communication with the third network node 512. Thus, the second signal S62 informs the wireless device 506 about the change of master node and instructs the wireless device 506 to reuse already existing protocol entities and context for communication with the new master node, e.g. with the third network node 512.

The second set of existing protocol entities and context for communication with the third network node 512 may comprise one or more of the protocol entities and context mentioned above under Action 601 and already existing and/or established for communicating with the third network node 512. For example, the second set of existing protocol entities and context for communication with the third network node 512 may comprise the RLC entity and the security key, etc.

Action 603

In order to inform the second network node 510 about a change of master node, the second network node 510 receives a third signal S63. As illustrated in FIG. 6, the third signal S63 is transmitted by the third network node 512.

The third signal S63 comprises information that the third network node 512 is the master node for the wireless device 506 and information to the second network node 510 to reuse a third set of existing protocol entities and context for communication with the wireless device 506. Thus, the third signal S63 informs the second network node 510 about the change of master node and instructs the second network node 510 to reuse already existing protocol entities and context for communication with the wireless device 506.

The third set of existing protocol entities and context for communication with the wireless device 506 may comprise one or more of the protocol entities and context mentioned above under Action 601 and already existing and/or established for communicating with the wireless device 506. For example, the third set of existing protocol entities and context for communication with the wireless device 506 may comprise the RLC entity and the security key, etc.

Following the Actions 601-603 described above the master node for the wireless device 506 is changed. However, some embodiments disclosed herein also comprise one or more of Actions 604-607, which will be described below.

Action 604

In response to the received first signal S61, the third network node 512 may transmit a first acknowledgement signal S64 to the transmitter of the first signal S61, e.g. to the wireless device 506 or the first network node 508. The first acknowledgement signal S64 acknowledges receipt of the first signal S61 informing the third network node 512 about the change of master node.

Action 605

In response to the received second signal S62, the wireless device 506 may transmit a second acknowledgement signal S65 to the transmitter of the second signal S62, e.g. to the first network node 508 or the third network node 512. The second acknowledgement signal S65 acknowledges receipt of the second signal S62.

Action 606

In response to the received third signal S63, the second network node 510 may transmit a third acknowledgement signal S66 to the transmitter of the third signal S63, e.g. to the third network node 512. The third acknowledgement signal S66 acknowledges receipt of the third signal S63.

Action 607

The third network node 512 may transmit a fourth signal S67 to a core network node 504. The fourth signal S67 informs the core network node 504 that the third network node 512 is the master node for the wireless device 506.

Figure 7:
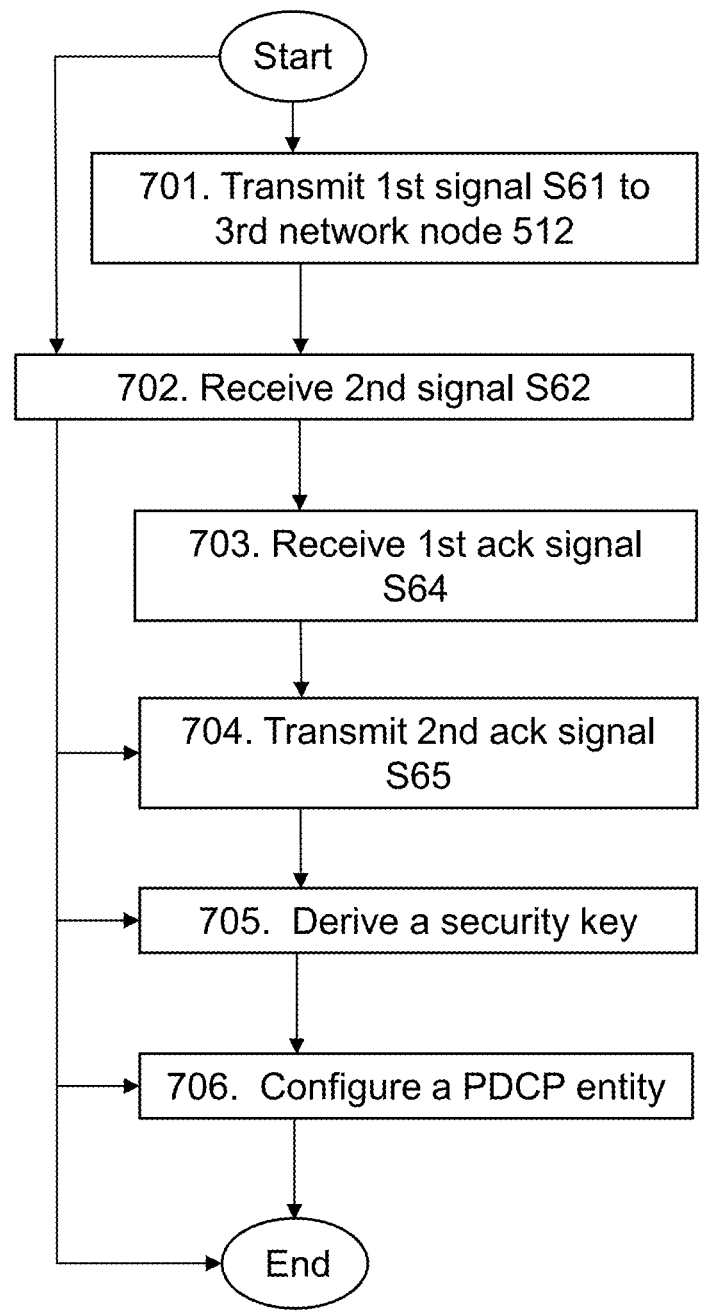
FIG. 7 is a flowchart depicting embodiments of a method performed by a wireless device.

An example of a method performed by the wireless device 506 for changing master node for the wireless device 506 will now be described with reference to a flowchart illustrated in FIG. 7. As mentioned above, the wireless device 506, the first network node 508, the second network node 510 and the third network node 512 are operating in the wireless communications system 500. Further, the first network node 508 is the master node for the wireless device 506, and the second network node 510 and the third network node 512 are secondary nodes for the wireless device 506.

The method comprises one or more of the following actions. It should be understood that some actions are optional, that some actions may be taken in another suitable order and that actions may be combined.

Action 701

In some embodiments, the wireless device 506 transmits a first signal S61 to the third network node 512. This is done to inform the third network node 512 about the change of master node for the wireless device 506. As previously mentioned, the first signal S61 comprises information that the third network node 512 is to be the master node for the wireless device 506 and information to the third network node 512 to reuse a first set of existing protocol entities and context for communication with the wireless device 506.

As mentioned above, the existing protocol entities and context may comprise one or more RLC entities and/or one or more MAC entities, and wherein the context comprises one or more of: state information such as an RRC state; security-related information such as a security capability or a key material; a UE identity such as an identity of a UE-associated logical S1-connection; and a UE radio access capability. Thus, the first set of existing protocol entities and context may comprise one or more of the existing protocol entities and context for communication with the wireless device 506.

This action corresponds to Action 601 described above.

Action 702

The wireless device 506 receives a second signal S62. This is done to inform the third wireless device 506 about the change of master node. As mentioned above, the second signal S62 comprises information about a change of master node from the first network node 508 to the third network node 512 and information to the wireless device 506 to reuse a second set of existing protocol entities and context for communication with the third network node 512.

As previously mentioned, the second set of existing protocol entities and context for communication with the third network node 512 may comprise one or more of the protocol entities and context mentioned above under Action 701 and already existing and/or established for communicating with the third network node 512.

In some embodiments, the wireless device 506 receives the second signal S62 from the first network node 508 or the third network node 512.

This action corresponds to Action 602 described above.

Action 703

The wireless device 506 may receive a first acknowledgement signal S64 from the third network node 512. The first acknowledgement signal S64 acknowledges receipt of the first signal S61 at the third network node 512.

This action corresponds to Action 604 described above.

Action 704

In order to acknowledge receipt of the second signal S62, the wireless device 506 may transmit a second acknowledgement signal S65 to the third network node 512.

This action corresponds to Action 605 described above.

Action 705

In some embodiments, the wireless device 506 derive a security key to be used in a radio bearer between the wireless device 506 and the third network node 512. The radio bearer may be a data radio bearer, e.g. a user data radio bearer, or a signaling radio bearer.

Action 706

The wireless device 506 may configure a Packet Data Convergence Protocol (PDCP) entity for the radio bearer between the wireless device 506 and the third network node 512. The PDCP entity may be a PDCP entity for a data radio bearer or a signaling radio bearer.

Figure 8:
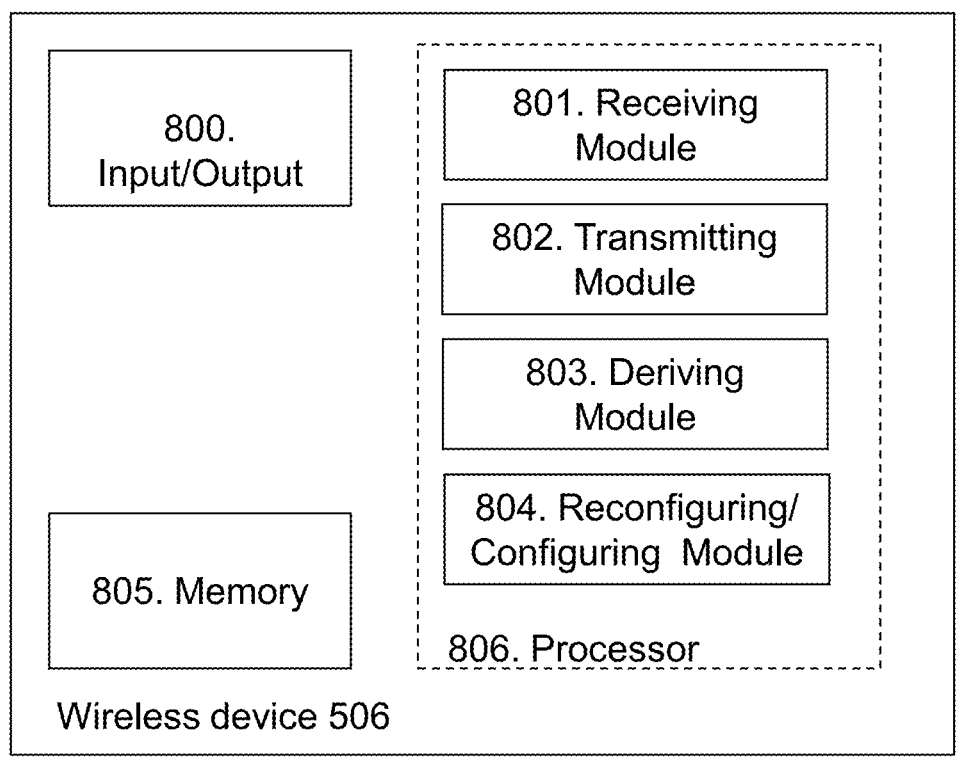
FIG. 8 is a schematic block diagram illustrating embodiments of a wireless device.

To perform the method for changing master node for the wireless device 506, the wireless device 506 may be configured according to an arrangement depicted in FIG. 8. As mentioned above, the wireless device 506, the first network node 508, the second network node 510 and the third network node 512 are operating in the wireless communications system 500. Further, the first network node 508 is the master node for the wireless device 506, and the second network node 510 and the third network node 512 are secondary nodes for the wireless device 506.

In some embodiments, the wireless device 506 comprises an input and output interface 800 configured to communicate with one or more the network nodes e.g. the first, second and third network nodes 508,510,512. The input and output interface 800 may comprise a wireless receiver (not shown) and a wireless transmitter (not shown).

The wireless device 506 is configured to receive, by means of a receiving module 801 configured to receive, a signal from a network node, e.g. from the first, second or third network node 508,510,512. The receiving module 801 may be implemented by or arranged in communication with a processor 806 of the wireless device 506. The processor 806 will be described in more detail below.

The wireless device 506 is configured to receive a second signal S62, which second signal S62 comprises information about a change of master node from the first network node 508 to the third network node 512 and information to the wireless device 506 to reuse a second set of existing protocol entities and context for communication with the third network node 512.

As previously mentioned, the second set of existing protocol entities and context for communication with the third network node 512 may comprise one or more of the protocol entities and context mentioned above under Action 701 and already existing and/or established for communicating with the third network node 512. Thus, the second set of existing protocol entities and context may comprise one or more of the existing protocol entities and context for communication with the third network node 512.

The wireless device 506 may be configured to receive the second signal S62 from the first network node 508 or the third network node 512.

In some embodiments, the wireless device 506 is configured to receive a first acknowledgement signal S64 from the third network node 512, which first acknowledgement signal S64 acknowledges receipt of the first signal S61.

The wireless device 506 is configured to transmit, by means of a transmitting module 802 configured to transmit, a signal to a network node, e.g. to the first, second or third network node 508,510,512. The transmitting module 802 may be implemented by or arranged in communication with the processor 806 of the wireless device 506.

The wireless device 506 may be configured to transmit a first signal S61 to the third network node 512, which first signal S61 comprises information that the third network node 512 is to be the master node for the wireless device 506 and information to the third network node 512 to reuse a first set of existing protocol entities and context for communication with the wireless device 506.

As mentioned above, the existing protocol entities and context may comprise one or more RLC entities and/or one or more MAC entities, and wherein the context comprises one or more of: state information such as an RRC state; security-related information such as a security capability or a key material; a UE identity such as an identity of a UE-associated logical S1-connection; and a UE radio access capability. Thus, the first set of existing protocol entities and context may comprise one or more of the existing protocol entities and context for communication with the wireless device 506.

In some embodiments, the wireless device 506 is configured to transmit a second acknowledgement signal S65 to the third network node 512, which second acknowledgement signal S65 acknowledges receipt of the second signal S62.

The wireless device 506 may be configured to derive, by means of a deriving module 803 configured to derive, a security key to be used in a radio bearer between the wireless device 506 and the third network node 512. The deriving module 803 may be implemented by or arranged in communication with the processor 806 of the wireless device 506.

As previously mentioned, the radio bearer may be data radio bearer, e.g. a user data radio bearer, or a signalling radio bearer.

The wireless device 506 may be configured to configure, e.g. reconfigure, by means of a configuring module 804 configured to configure, a Packet Data Convergence Protocol (PDCP) entity for the radio bearer between the wireless device 506 and the third network node 512. The configuring module 804 may be implemented by or arranged in communication with the processor 806 of the wireless device 506.

The wireless device 506 may also comprise means for storing data. In some embodiments, the wireless device 506 comprises a memory 805 configured to store the data. The data may be processed or non-processed data and/or information relating thereto. The memory 805 may comprise one or more memory units. Further, the memory 805 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the wireless device 506.

Embodiments herein for changing master node for the wireless device 506 may be implemented through one or more processors, such as the processor 806 in the arrangement depicted in FIG. 8, together with computer program code for performing the functions and/or method actions of embodiments herein. The program code mentioned above may also be provided as a computer program product, for instance in the form of a data carrier carrying computer program code for performing the embodiments herein when being loaded into the wireless device 506. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the wireless device 506.

Those skilled in the art will also appreciate that the input/output interface 800, the receiving module 801, the transmitting module 802, the deriving module 803 and the configuring module 504 above may refer to a combination of analog and digital circuits, and/or one or more processors configured with software and/or firmware, e.g. stored in the memory 805, that when executed by the one or more processors such as the processors in the wireless device 506 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 9:
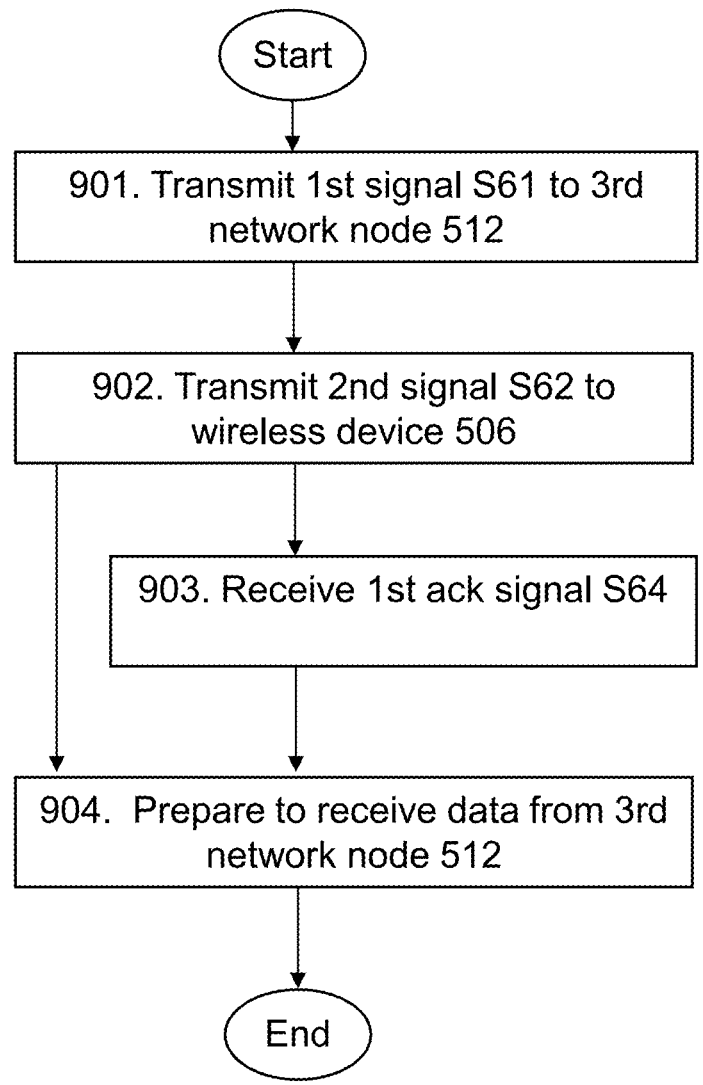
FIG. 9 is a flowchart depicting embodiments of a method performed by a first network node.

An example of a method performed by the first network node 508 for changing master node for the wireless device 506 will now be described with reference to a flowchart illustrated in FIG. 9. As mentioned above, the wireless device 506, the first network node 508, the second network node 510 and the third network node 512 are operating in the wireless communications system 500. Further, the first network node 508 is the master node for the wireless device 506, and the second network node 510 and the third network node 512 are secondary nodes for the wireless device 506.

The method comprises one or more of the following actions. It should be understood that some actions are optional, that some actions may be taken in another suitable order and that actions may be combined.

Action 901

The first network node 508 transmits a first signal S61 to the third network node 512, which first signal S61 comprises information that the third network node 512 is to be the master node for the wireless device 506 and information to the third network node 512 to reuse a first set of existing protocol entities and context for communication with the wireless device 506.

This action corresponds to Action 601 described above.

Action 902

The first network node 508 transmits a second signal S62 to the wireless device 506, which second signal S62 comprises information about a change of master node from the first network node 508 to the third network node 512 and information to the wireless device 506 to reuse a second set of existing protocol entities and context for communication with the third network node 512. Thereby the master node for the wireless device 506 is changed.

As previously above, the existing protocol entities and context may comprise one or more RLC entities and/or one or more MAC entities, and wherein the context comprises one or more of: state information such as an RRC state; security-related information such as a security capability or a key material; a UE identity such as an identity of a UE-associated logical S1-connection; and a UE radio access capability. Thus, the second set of existing protocol entities and context may comprise one or more of the existing protocol entities and context for communication with the third network node 512.

This action corresponds to Action 602 described above.

Action 903

In some embodiments, the first network node 508 receives a first acknowledgement signal S64 from the third network node 512, which first acknowledgement signal S64 acknowledges receipt of the first signal S61.

This action corresponds to Action 604 described above.

Action 904

In some embodiments, the first network node 508 prepares to receive data from the third network node 512. For example, the first network node 508 may prepare to receive data from the third network node 512 by setting up a tunnel using a GPRS Tunneling Protocol (GTP), e.g. a GTP tunnel, between the first network node 508 and the third network node 512. A Tunnel Endpoint IDentifier (TEID) of the GTP tunnel may be the third network node 512.

Figure 10:
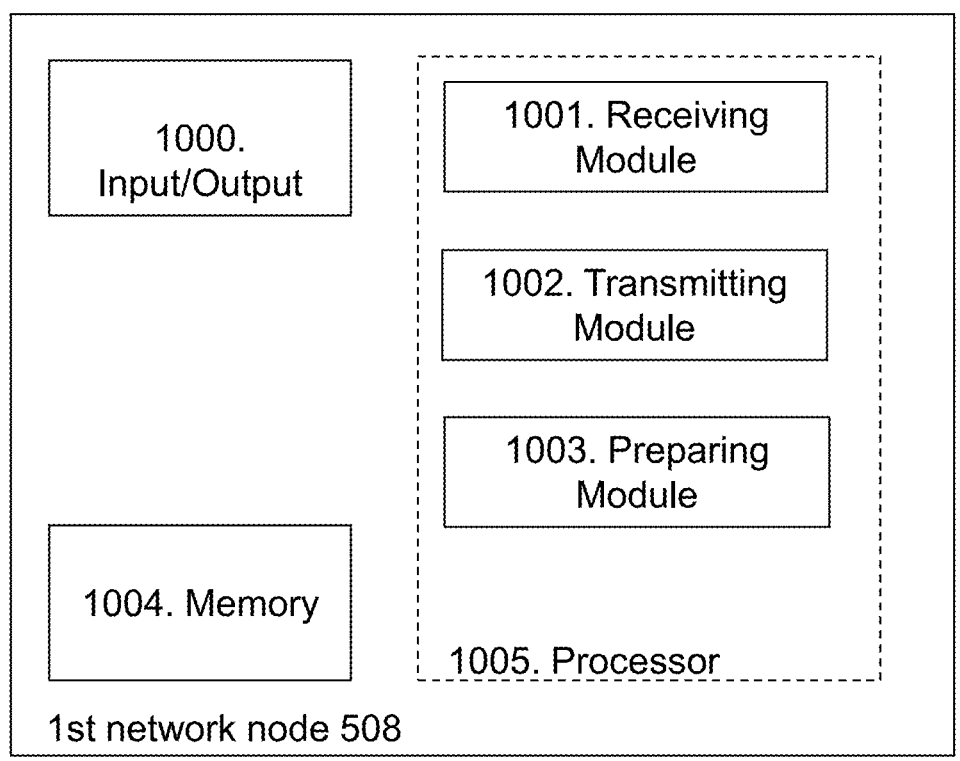
FIG. 10 is a schematic block diagram illustrating embodiments of a first network node.

To perform the method for changing master node for the wireless device 506, the first network node 508 may be configured according to an arrangement depicted in FIG. 10. As mentioned above, the wireless device 506, the first network node 508, the second network node 510 and the third network node 512 are operating in the wireless communications system 500. Further, the first network node 508 is the master node for the wireless device 506, and the second network node 510 and the third network node 512 are secondary nodes for the wireless device 506.

In some embodiments, the first network node 508 comprises an input and output interface 1000 configured to communicate with one or more wireless device, e.g. the wireless device 506, or one or more the network nodes e.g. the second or third network nodes 510,512. The input and output interface 1000 may comprise a wireless receiver (not shown) and a wireless transmitter (not shown).

The first network node 508 is configured to receive, by means of a receiving module 1001 configured to receive, a signal from a wireless device, e.g. the wireless device 506 or a network node, e.g. from the second or third network node 510,512. The receiving module 1001 may be implemented by or arranged in communication with a processor 1005 of the first network node 508. The processor 1005 will be described in more detail below.

In some embodiments, the first network node 508 is configured to receive a first acknowledgement signal S64 from the third network node 512, which first acknowledgement signal S64 acknowledges receipt of a first signal S61 transmitted from the first network node 508 to the third network node 512.

The first network node 508 is configured to transmit, by means of a transmitting module 1002 configured to transmit, a signal to a wireless device, e.g. the wireless device 506, or to a network node, e.g. to the second or third network node 510,512. The transmitting module 1002 may be implemented by or arranged in communication with the processor 1005 of the first network node 508.

The first network node 508 is configured to transmit a first signal S61 to the third network node 512. The first signal S61 comprises information that the third network node 512 is to be the master node for the wireless device 506 and information to the third network node 512 to reuse a first set of existing protocol entities and context for communication with the wireless device 506.

Further, the first network node 508 is configured to transmit a second signal S62 to the wireless device 506. The second signal S62 comprises information about a change of master node from the first network node 508 to the third network node 512 and information to the wireless device 506 to reuse a second set of existing protocol entities and context for communication with the third network node 512. Thereby the master node for the wireless device 506 is changed.

As mentioned above, the existing protocol entities and context may comprise one or more RLC entities and/or one or more MAC entities, and wherein the context comprises one or more of: state information such as an RRC state; security-related information such as a security capability or a key material; a UE identity such as an identity of a UE-associated logical S1-connection; and a UE radio access capability. Thus, the first and second sets of existing protocol entities and context may comprise one or more of the existing protocol entities and context for communication between the wireless device 506 and the third network node 512.

The first network node 508 may be configured to prepare, by means of a preparing module 1003 configured to prepare, to receive data from the third network node 512. The preparing module 1003 may be implemented by or arranged in communication with the processor 1005 of the first network node 508.

For example and as mentioned above, the first network node 508 may prepare to receive data from the third network node 512 by setting up a tunnel, e.g. the GTP tunnel, between the first network node 508 and the third network node 512. A Tunnel Endpoint IDentifier (TEID) of the GTP tunnel may be the third network node 512.

The first network node 508 may also comprise means for storing data. In some embodiments, the first network node 508 comprises a memory 1004 configured to store the data. The data may be processed or non-processed data and/or information relating thereto. The memory 1004 may comprise one or more memory units. Further, the memory 1004 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the first network node 508.

Embodiments herein for changing master node for the wireless device 506 may be implemented through one or more processors, such as the processor 1005 in the arrangement depicted in FIG. 10, together with computer program code for performing the functions and/or method actions of embodiments herein. The program code mentioned above may also be provided as a computer program product, for instance in the form of a data carrier carrying computer program code for performing the embodiments herein when being loaded into the first network node 508. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the first network node 508.

Those skilled in the art will also appreciate that the input/output interface 1000, the receiving module 1001, the transmitting module 1002, and the preparing module 1003 above may refer to a combination of analog and digital circuits, and/or one or more processors configured with software and/or firmware, e.g. stored in the memory 1004, that when executed by the one or more processors such as the processors in the first network node 508 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 11:
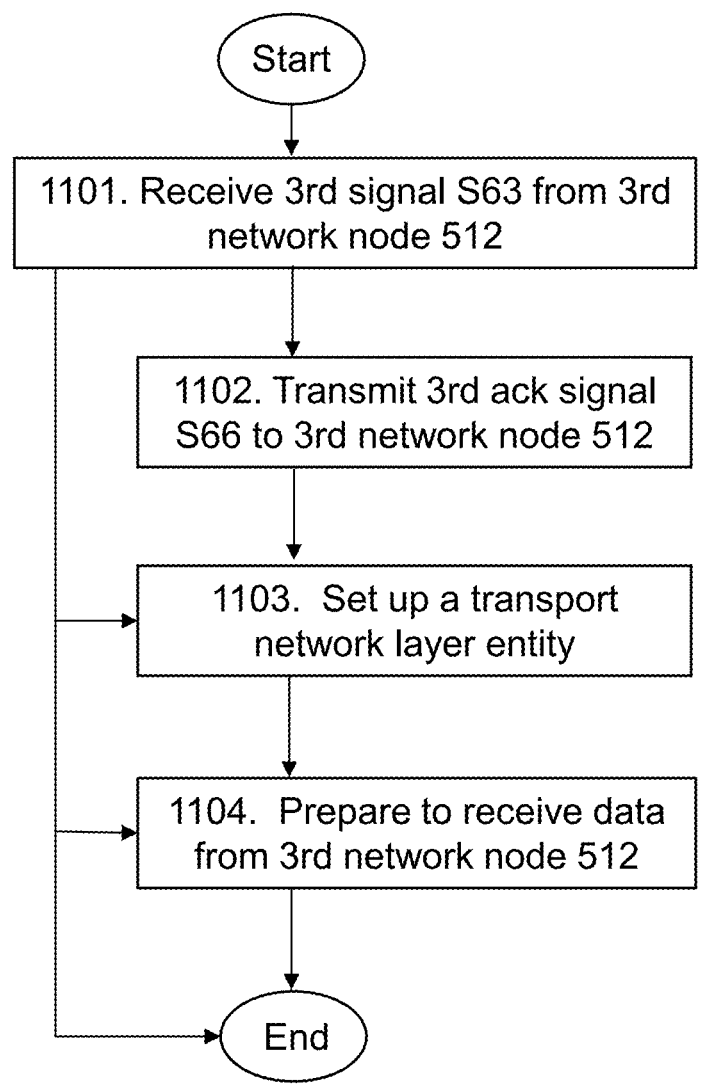
FIG. 11 is a flowchart depicting embodiments of a method performed by a second network node.

An example of a method performed by the second network node 510 for changing master node for the wireless device 506 will now be described with reference to a flowchart illustrated in FIG. 11. As mentioned above, the wireless device 506, the first network node 508, the second network node 510 and the third network node 512 are operating in the wireless communications system 500. Further, the first network node 508 is the master node for the wireless device 506, and the second network node 510 and the third network node 512 are secondary nodes for the wireless device 506.

The method comprises one or more of the following actions. It should be understood that some actions are optional, that some actions may be taken in another suitable order and that actions may be combined.

Action 1101

The second network node 510 receives a third signal S63. The third signal S63 comprises information that the third network node 512 is the master node for the wireless device 506 and information to the second network node 510 to reuse a third set of existing protocol entities and context for communication with the wireless device 506. Thereby the second network node 510 assists in changing master node for the wireless device 506.

In some embodiments, the second network node 510 receives the third signal S63 from the third network node 512.

As previously above, the existing protocol entities and context may comprise one or more RLC entities and/or one or more MAC entities, and wherein the context comprises one or more of: state information such as a RRC, state; security-related information such as a security capability or a key material; a UE identity such as an identity of a UE-associated logical S1-connection; and a UE radio access capability. Thus, the third set of existing protocol entities and context may comprise one or more of the existing protocol entities and context for communication with the wireless device 506.

This action corresponds to Action 603 described above.

Action 1102

The second network node 510 may transmit a third acknowledgement signal S66 to the third network node 512, which third acknowledgement signal S66 acknowledges receipt of the third signal S63.

This action corresponds to Action 606 described above.

Action 1103

In some embodiments, the second network node 510 sets up or reconfigure a transport network layer entity to the third network node 512. For example, the transport network layer entity may be a GPRS Tunneling Protocol (GTP) entity, e.g. a GTP-U entity for transfer of user data.

Action 1104

In some embodiments, the second network node 510 prepares to receive data from the third network node 512. For example, the second network node 510 may prepare to receive data from the third network node 512 by setting up a tunnel using a GPRS Tunneling Protocol (GTP), e.g. a GTP tunnel, between the second network node 510 and the third network node 512. A Tunnel Endpoint IDentifier (TEID) of the GTP tunnel may be the third network node 512.

Figure 12:
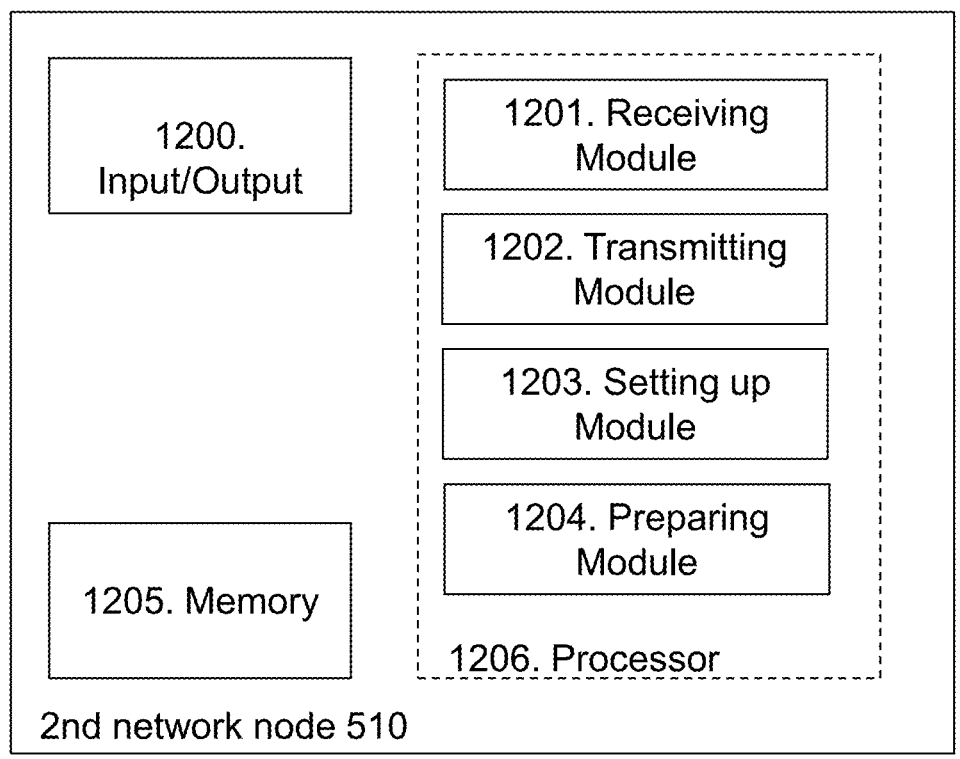
FIG. 12 is a schematic block diagram illustrating embodiments of a second network node.

To perform the method for changing master node for the wireless device 506, the second network node 510 may be configured according to an arrangement depicted in FIG. 12. As mentioned above, the wireless device 506, the first network node 508, the second network node 510 and the third network node 512 are operating in the wireless communications system 500. Further, the first network node 508 is the master node for the wireless device 506, and the second network node 510 and the third network node 512 are secondary nodes for the wireless device 506.

In some embodiments, the second network node 510 comprises an input and output interface 1200 configured to communicate with one or more wireless device, e.g. the wireless device 506, or one or more the network nodes e.g. the first or third network nodes 508,512. The input and output interface 1200 may comprise a wireless receiver (not shown) and a wireless transmitter (not shown).

The second network node 510 is configured to receive, by means of a receiving module 1201 configured to receive, a signal from a wireless device, e.g. the wireless device 506 or a network node, e.g. from the first or third network node 508,512. The receiving module 1201 may be implemented by or arranged in communication with a processor 1206 of the second network node 510. The processor 1206 will be described in more detail below.

The second network node 510 is configured to receive a third signal S63, which third signal S63 comprises information that the third network node 512 is the master node for the wireless device 506 and information to the second network node 510 to reuse a third set of existing protocol entities and context for communication with the wireless device 506. Thereby the second network node 510 assists in changing master node for the wireless device 506.

In some embodiments, the second network node 510 is configured to receive the third signal S63 from the third network node 512.

As previously above, the existing protocol entities and context may comprise one or more RLC entities and/or one or more MAC entities, and wherein the context comprises one or more of: state information such as an RRC state; security-related information such as a security capability or a key material; a UE identity such as an identity of a UE-associated logical S1-connection; and a UE radio access capability. Thus, the third set of existing protocol entities and context may comprise one or more of the existing protocol entities and context for communication with the wireless device 506.

The second network node 510 is configured to transmit, by means of a transmitting module 1202 configured to transmit, a signal to a wireless device, e.g. the wireless device 506, or to a network node, e.g. to the first or third network node 508,512. The transmitting module 1202 may be implemented by or arranged in communication with the processor 1206 of the second network node 510.

The second network node 510 is configured to configured to transmit a third acknowledgement signal S66 to the third network node 512, which third acknowledgement signal S66 acknowledges receipt of the third signal S63.

As mentioned above, the existing protocol entities and context may comprise one or more RLC entities and/or one or more MAC entities, and wherein the context comprises one or more of: state information such as an RRC state; security-related information such as a security capability or a key material; a UE identity such as an identity of a UE-associated logical S1-connection; and a UE radio access capability. Thus, the first and second sets of existing protocol entities and context may comprise one or more of the existing protocol entities and context for communication between the wireless device 506 and the third network node 512.

The second network node 510 may be configured to set up, by means of a setting up module 1203 configured to set up, a transport network layer entity to the third network node 512. The setting up module 1203 may be implemented by or arranged in communication with the processor 1206 of the second network node 510.

The second network node 510 may be configured to prepare, by means of a preparing module 1204 configured to prepare, to receive data from the third network node 512. The preparing module 1204 may be implemented by or arranged in communication with the processor 1206 of the second network node 510.

For example, the transport network layer entity may be a GTP entity, e.g. a GTP-U entity.

For example and as mentioned above, the second network node 510 may prepare to receive data from the third network node 512 by setting up a tunnel, e.g. the GTP tunnel, between the first network node 508 and the third network node 512. A Tunnel Endpoint IDentifier (TEID) of the GTP tunnel may be the third network node 512.

The second network node 510 may also comprise means for storing data. In some embodiments, the second network node 510 comprises a memory 1205 configured to store the data. The data may be processed or non-processed data and/or information relating thereto. The memory 1205 may comprise one or more memory units. Further, the memory 1205 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the second network node 510.

Embodiments herein for changing master node for the wireless device 506 may be implemented through one or more processors, such as the processor 1206 in the arrangement depicted in FIG. 12, together with computer program code for performing the functions and/or method actions of embodiments herein. The program code mentioned above may also be provided as a computer program product, for instance in the form of a data carrier carrying computer program code for performing the embodiments herein when being loaded into the second network node 510. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the second network node 510.

Those skilled in the art will also appreciate that the input/output interface 1200, the receiving module 1201, the transmitting module 1202, the setting up module 1203 and the preparing module 1204 above may refer to a combination of analog and digital circuits, and/or one or more processors configured with software and/or firmware, e.g. stored in the memory 1205, that when executed by the one or more processors such as the processors in the second network node 510 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Figure 13:
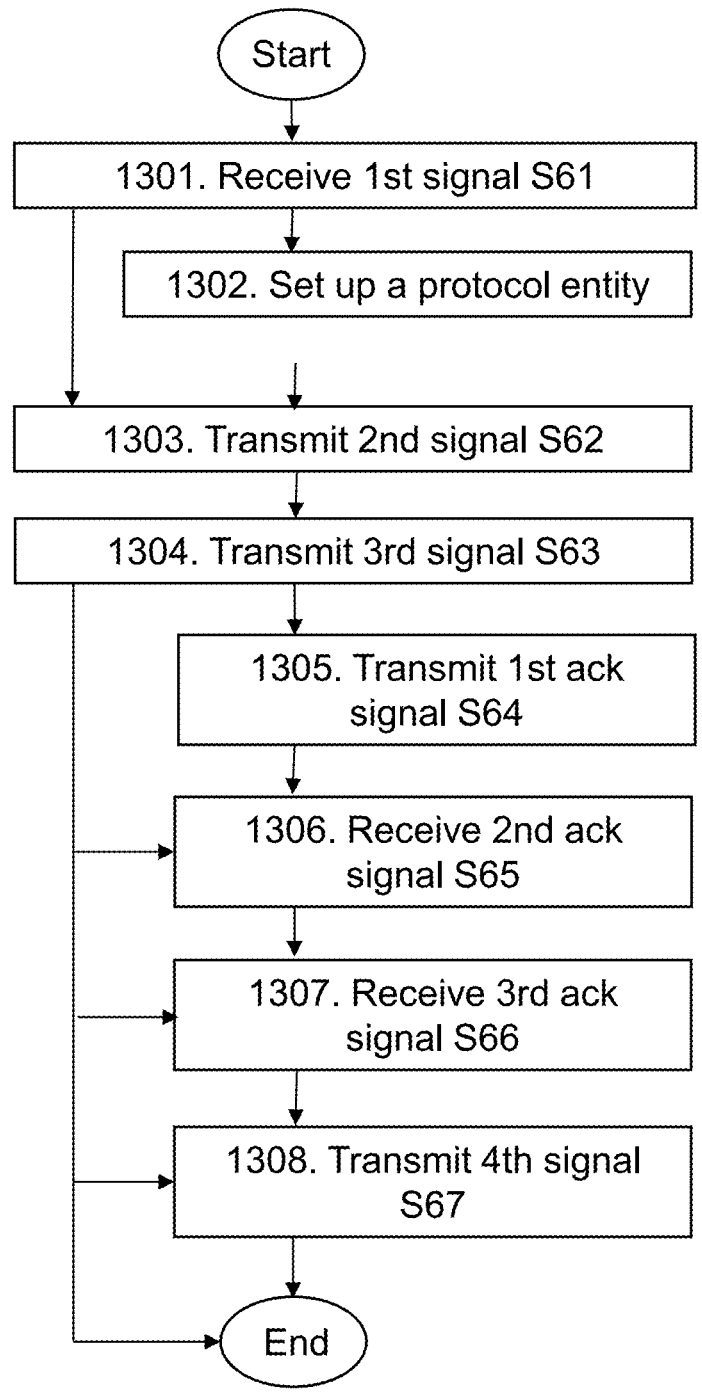
FIG. 13 is a flowchart depicting embodiments of a method performed by a third network node.

An example of a method performed by the third network node 512 for changing master node for the wireless device 506 will now be described with reference to a flowchart illustrated in FIG. 13. As mentioned above, the wireless device 506, the first network node 508, the second network node 510 and the third network node 512 are operating in the wireless communications system 500. Further, the first network node 508 is the master node for the wireless device 506, and the second network node 510 and the third network node 512 are secondary nodes for the wireless device 506.

The method comprises one or more of the following actions. It should be understood that some actions are optional, that some actions may be taken in another suitable order and that actions may be combined.

Action 1301

In order to inform the third network node 512 about a change of master node, the third network node 512 receives a first signal S61. The first signal S61 comprises information that the third network node 512 is to be the master node for the wireless device 506 and information to the third network node 512 to reuse a first set of existing protocol entities and context for communication with the wireless device 506.

As previously above, the existing protocol entities and context may comprise one or more RLC entities and/or one or more MAC entities, and wherein the context comprises one or more of: state information such as an RRC state; security-related information such as a security capability or a key material; a UE identity such as an identity of a UE-associated logical S1-connection; and a UE radio access capability. Thus, the first set of existing protocol entities and context may comprise one or more of the existing protocol entities and context for communication with the wireless device 506. In some embodiments, the third network node 512 receives the first signal S61 from the first network node 508 or the wireless device 506.

This action corresponds to Action 601 described above.

Action 1302

In some embodiments, the third network node 512 sets up a protocol entity. For example, the protocol layer entity may be a PDCP layer entity for the communication with the wireless device 506.

Action 1303

The third network node 512 transmits a second signal S62 to the wireless device 506, which second signal S62 comprises information about a change of master node from the first network node 508 to the third network node 512 and information to the wireless device 506 to reuse a second set of existing protocol entities and context for communication with the third network node 512.

In some embodiments, the third network node 512 transmits the second signal S62 to the wireless device 506 via the first network node 508.

The second set of existing protocol entities and context may comprise one or more of the existing protocol entities and context for communication with the third network node 512.

This action corresponds to Action 602 described above.

Action 1304

The third network node 512 transmits a third signal S63 to the second network node 510, which third signal S63 comprises information that the third network node 512 is the master node for the wireless device 506 and information to the second network node 510 to reuse a third set of existing protocol entities and context for communication with the wireless device 506. After the Actions 1301-1303, the master node for the wireless device 506 is changed.

This action corresponds to Action 603 described above.

Action 1305

In some embodiments, the third network node 512 transmits a first acknowledgement signal S64 to the first network node 508 or the wireless device 506, which first acknowledgement signal S64 acknowledges receipt of the first signal S61.

This action corresponds to Action 604 described above.

Action 1306

In some embodiments, the third network node 512 receives a second acknowledgement signal S65 from the wireless device 506, which second acknowledgement signal S65 acknowledges receipt of the second signal S2.

This action corresponds to Action 605 described above.

Action 1307

In some embodiments, the third network node 512 receives a third acknowledgement signal S66 from the second network node 510, which third acknowledgement signal S66 acknowledges receipt of the third signal S63.

This action corresponds to Action 606 described above.

Action 1308

In some embodiments, the third network node 512 transmits a fourth signal S67 to a core network node 504, which fourth signal S67 informs the core network node 504 that the third network node 512 is the master node for the wireless device 506.

This action corresponds to Action 607 described above.

Figure 14:
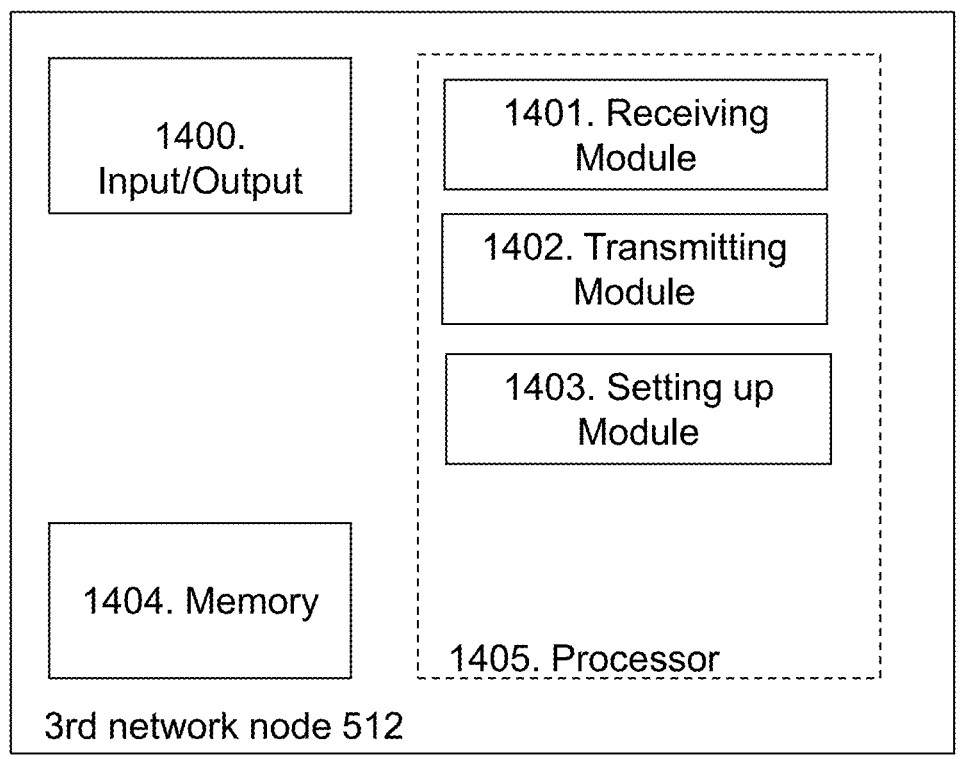
FIG. 14 is a schematic block diagram illustrating embodiments of a third network node.

To perform the method for changing master node for the wireless device 506, the third network node 512 may be configured according to an arrangement depicted in FIG. 14. As mentioned above, the wireless device 506, the first network node 508, the 30 second network node 510 and the third network node 512 are operating in the wireless communications system 500. Further, the first network node 508 is the master node for the wireless device 506, and the second network node 510 and the third network node 512 are secondary nodes for the wireless device 506.

In some embodiments, the third network node 512 0 comprises an input and output interface 1400 configured to communicate with one or more wireless device, e.g. the wireless device 506, or one or more the network nodes e.g. the first or second network nodes 508,510. The input and output interface 1400 may comprise a wireless receiver (not shown) and a wireless transmitter (not shown).

The third network node 512 is configured to receive, by means of a receiving module 1401 configured to receive, a signal from a wireless device, e.g. the wireless device 506 or a network node, e.g. from the first or second network node 508,510. The receiving module 1401 may be implemented by or arranged in communication with a processor 1404 of the third network node 512. The processor 1404 will be described in more detail below.

The third network node 512 is configured to receive a first signal S61, which first signal S61 comprises information that the third network node 512 is to be the master node for the wireless device 506 and information to the third network node 512 to reuse a first set of existing protocol entities and context for communication with the wireless device 506.

As previously above, the existing protocol entities and context may comprise one or more RLC entities and/or one or more MAC entities, and wherein the context comprises one or more of: state information such as a RRC, state; security-related information such as a security capability or a key material; a UE identity such as an identity of a UE-associated logical S1-connection; and a UE radio access capability. Thus, the first set of existing protocol entities and context may comprise one or more of the existing protocol entities and context for communication with the wireless device 506.

The third network node 512 may be configured to receive the first signal S61 from the first network node 508 or the wireless device 506.

In some embodiments, the third network node 512 is configured to receive a second acknowledgement signal S65 from the wireless device 506, which second acknowledgement signal S65 acknowledges receipt of a second signal S62 transmitted from the third network node 512 to the wireless device 506.

The third network node 512 may further be configured to receive a third acknowledgement signal S66 from the second network node 510, which third acknowledgement signal S66 acknowledges receipt of the third signal S63.

The third network node 512 is configured to transmit, by means of a transmitting module 1402 configured to transmit, a signal to a wireless device, e.g. the wireless device 506, or to a network node, e.g. to the first or second network node 508,510. The transmitting module 1402 may be implemented by or arranged in communication with the processor 1404 of the third network node 512.

The third network node 512 is configured to transmit the second signal S62 to the wireless device 506, which second signal S62 comprises information about a change of master node from the first network node 508 to the third network node 512 and information to the wireless device 506 to reuse a second set of existing protocol entities and context for communication with the third network node 512.

Further, the third network node 512 is configured to transmit a third signal S63 to the second network node 510, which third signal S63 comprises information that the third network node 512 is the master node for the wireless device 506 and information to the second network node 510 to reuse a third set of existing protocol entities and context for communication with the wireless device 506. Thereby the master node for the wireless device 506 is changed.

As mentioned above, the existing protocol entities and context may comprise one or more RLC entities and/or one or more MAC entities, and wherein the context comprises one or more of: state information such as an RRC state; security-related information such as a security capability or a key material; a UE identity such as an identity of a UE-associated logical S1-connection; and a UE radio access capability. Thus, the second set of existing protocol entities and context may comprise one or more of the existing protocol entities and context for communication between the wireless device 506 and the third network node 512. Further, the third set of existing protocol entities and context may comprise one or more of the existing protocol entities and context for communication between the second network node 510 and the wireless device 506.

In some embodiments, the third network node 512 transmit a first acknowledgement signal S64 to the first network node 508 or the wireless device 506, which first acknowledgement signal S64 acknowledges receipt of the first signal S61.

The third network node 512 may transmit a fourth signal S67 to a core network node 504, which fourth signal S67 informs the core network node 504 that the third network node 512 is the master node for the wireless device 506.

The third network node 512 may be configured to set up, by means of a setting up module 1403 configured to set up, a protocol layer entity. The setting module 1403 may be implemented by or arranged in communication with the processor 1405 of the third network node 512.

The third network node 512 may also comprise means for storing data. In some embodiments, the second network node 510 comprises a memory 1404 configured to store the data. The data may be processed or non-processed data and/or information relating thereto. The memory 1404 may comprise one or more memory units. Further, the memory 1404 may be a computer data storage or a semiconductor memory such as a computer memory, a read-only memory, a volatile memory or a non-volatile memory. The memory is arranged to be used to store obtained information, data, configurations, schedulings, and applications etc. to perform the methods herein when being executed in the third network node 512.

Embodiments herein for changing master node for the wireless device 506 may be implemented through one or more processors, such as the processor 1405 in the arrangement depicted in FIG. 14, together with computer program code for performing the functions and/or method actions of embodiments herein. The program code mentioned above may also be provided as a computer program product, for instance in the form of a data carrier carrying computer program code for performing the embodiments herein when being loaded into the third network node 512. One such carrier may be in the form of an electronic signal, an optical signal, a radio signal or a computer readable storage medium. The computer readable storage medium may be a CD ROM disc or a memory stick.

The computer program code may furthermore be provided as program code stored on a server and downloaded to the third network node 512.

Those skilled in the art will also appreciate that the input/output interface 1400, the receiving module 1401, the transmitting module 1402, and the setting up module 1403 above may refer to a combination of analog and digital circuits, and/or one or more processors configured with software and/or firmware, e.g. stored in the memory 1404, that when executed by the one or more processors such as the processors in the third network node 512 perform as described above. One or more of these processors, as well as the other digital hardware, may be included in a single Application-Specific Integrated Circuitry (ASIC), or several processors and various digital hardware may be distributed among several separate components, whether individually packaged or assembled into a System-on-a-Chip (SoC).

Exemplifying Embodiments

Figure 15:
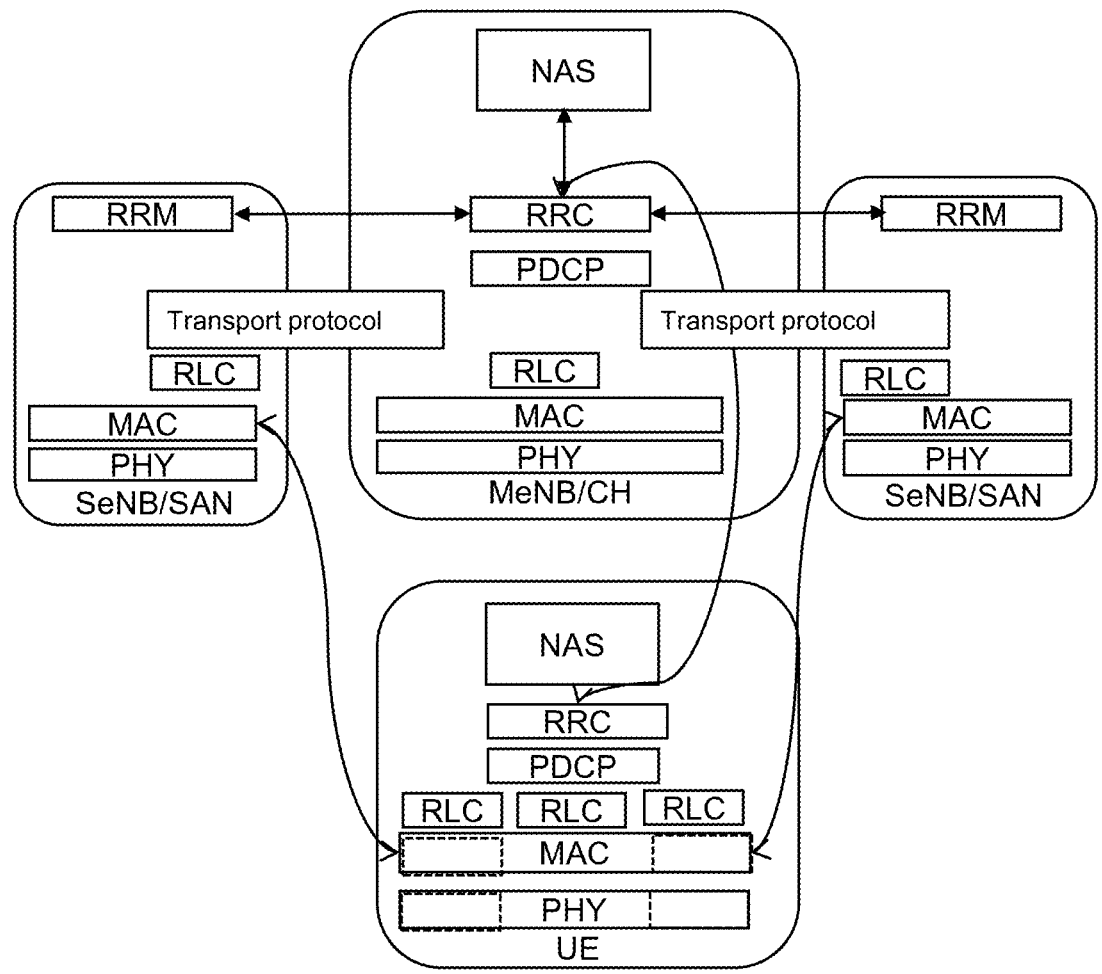
FIG. 15 schematically illustrates embodiments of a first protocol architecture.
Figure 16:
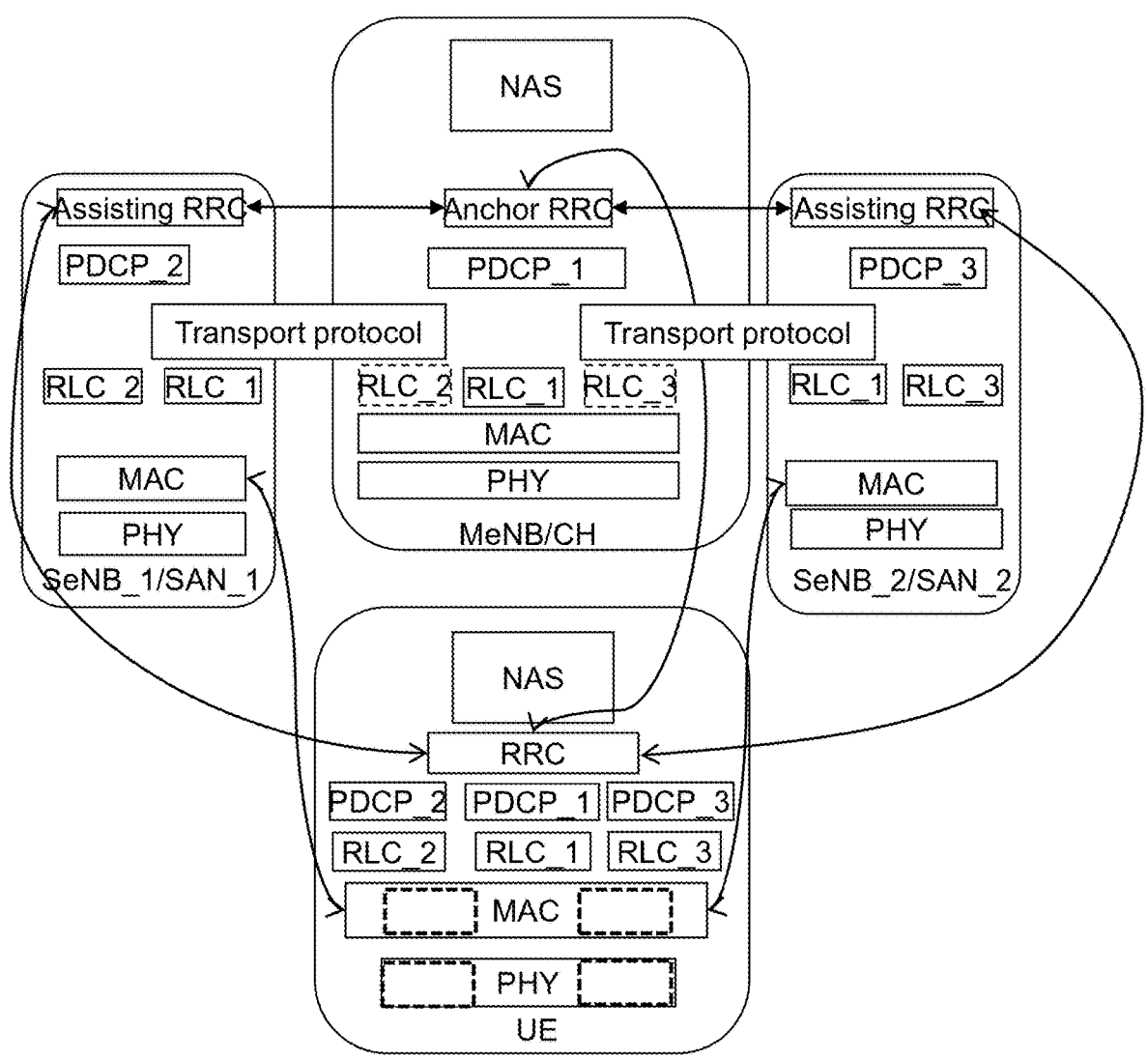
FIG. 16 schematically illustrates embodiments of a second protocol architecture.

As schematically illustrated in FIGS. 15 and 16 two protocol architectures may be provided for a cluster, e.g. multi-connectivity, in an NX communications network.

FIG. 15 schematically illustrates a first protocol architecture comprising one RRC connection between the UE, e.g. the wireless device 506, and the MeNB, e.g. the first network node 512, in the cluster, e.g. the communications network 500. In FIG. 15, the MeNB is also referred to as a Cluster Head (CH), and each of the SeNBs is also referred to as a Serving Access Node (SAN).

FIG. 16 schematically illustrates a second protocol architecture wherein each eNB, e.g. the first, second, and third network nodes 508,510,512, in the cluster, e.g. the communications network 500, has one RRC connection with the UE, e.g. the wireless device. The RRC of the MeNB is referred to as an Anchor RRC and the RRC of the SeNB is referred to as an Assisting RRC.

In the first protocol architecture, the RRC handling is an extension of LTE DC, and in the second protocol architecture, the assisting RRC at each SeNB, e.g. at the second and third network nodes 510,512, also set ups a UE context according to the information from the anchor RRC in the MeNB, e.g. the first network node 508. Assisting RRC may communicate with the UE directly using its own security key, e.g. its own S-KeNB. Since the UE maintains multiple Signal Radio Bearer (SRB) connections within the cluster, the UE needs to know how to send a signal, e.g. a packet, in the uplink to the right network node. In order to solve this issue, the logical channel ID assigned to the SRB between each network node and the UE must be unique among the nodes comprised in the cluster. The value of logical channel ID for SRB needs to use more values than those defined in LTE, i.e., 0, 1, 2.

Signaling Procedure for Enabling Fast Role-Switch

A signaling procedure for enabling fast role-switch will now be described with reference to FIG. 17. Consider the case when the MeNB, e.g. the first network node 508, actively requires one SeNB, e.g. the third network node 512, to switch roles in the cluster. For example, this may be due to that the average radio link quality between the UE, e.g. the wireless device 506, and the respective SeNB, e.g. the second and/or third network node 510,512, is better than the serving MeNB, e.g. the first network node 508.

Exemplifying signaling procedures for both the first and second protocol architectures are given below in FIG. 17.

Figure 17:
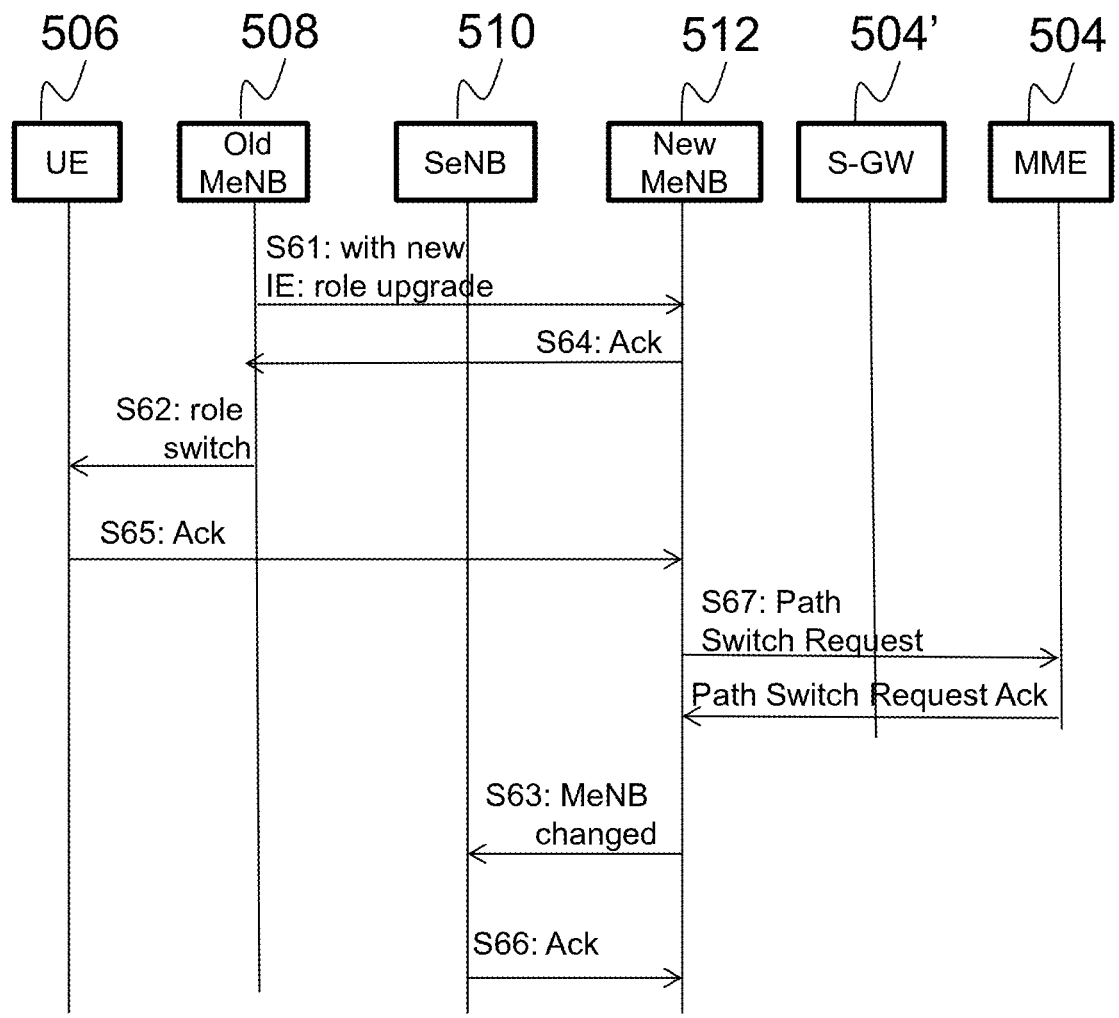
FIG. 17 schematically illustrates embodiments of the signaling procedure for change of master node for a wireless device.

As is illustrated in FIG. 17, the signaling either between different eNBs within the cluster or the signaling between the UE and the cluster are all simplified. Yet, there are some differences between the first protocol architecture and the second protocol architecture, which is mainly about what needs to be done.

For the first protocol architecture, firstly, the old MeNB, e.g. the first network node 508, asks the SeNB, e.g. the third network node 512, to get prepared to be the new MeNB. This may be done by the first network node 508 transmitting the first signal S61 to the third network node 512.

Secondly, if there is not a secondary cell group (SCG) bearer at the SeNB, e.g. at the third network node 512, the old MeNB, e.g. the first network node 508, needs to deliver a key S-KeNB to SeNB so that the SeNB is able to derive the key used for RRC and user plane. If there is already SCG bearer at the SeNB, the SeNB just needs to derive the key for RRC.

Thirdly, the SeNB, e.g. the third network node 512 (new MeNB), then prepares a Signaling Radio Bearer (SRB) between itself and the UE, e.g. the wireless device 506. That is, the third network node 512 sets up PDCP entity for RRC message. By means of SRB diversity, an RLC entity is already there in the SeNB, so it is not necessary to remove and set up a new RLC entity, the existing RLC entity is to be reused.

Fourthly, the SeNB (new MeNB) then set ups the PDCP entity for the split data bearer. Its existing RLC entity for split bearer is to be reused.

Fifthly, the Old MeNB informs the UE that there is a role switch in the cluster. This may be done by transmitting the second signal S62 to the wireless device 506. Then the UE set ups the SRB with the new MeNB, e.g. the third network node 512. If there is no SCG bearer at the SeNB (new MeNB), the UE derives the S-KeNB from the message received by the old MeNB, e.g. the first network node 508, and then the key for RRC and user plane. If there is already a SCG bearer at the SeNB, the UE already knows the security key, e.g. the S-KeNB, and therefore it is able to derive the key for RRC of the new MeNB directly. The UE reconfigures its PDCP entity for SRB/DRB, and all the RLC entity is to be remained.

Sixthly, the new MeNB, e.g. the third network node 512, informs the other SeNB, e.g. the second network node 510, in the cluster that it is MeNB now. This may be done by transmitting the third signal S63 to the second network node 510. TheoOther SeNB does not need to do anything except for configuring its transport protocol to prepare to receive signaling/data from the new MeNB.

Seventhly, the new MeNB informs the Core Network (CN), e.g. a Gateway (GW) or an Mobility Management Entity (MME), that it is MeNB now. This may be done by transmitting the fourth signal S67 to the CN node. The CN then delivers packets to new MeNB.

For the second protocol architecture, firstly, the old MeNB, e.g. the first network node 508, asks the SeNB, e.g. the third network node 512, to get prepared to be the new MeNB. This may be done by transmitting the first signal S61. The SRB at SeNB (new MeNB) is to be reused; nothing needs to be changed/updated in this case.

For a split data bearer, the SeNB (new MeNB) set ups the PDCP entity for split data bearer. Its existing RLC entity for the split bearer is to be reused.

For a SCG data bearer, nothing needs to be updated at the SeNB (new MeNB). The SCG data bearer will be the MCG data bearer.

Secondly, the old MeNB informs the UE that there is a role switch in the cluster. This may be done by transmitting the second signal S62. The SRB at the UE does not need to be updated. The UE reconfigures its PDCP entity for split data radio bearer (DRB), all the RLC entity is to be remained.

Thirdly, the new MeNB, e.g. the third network node 512, informs the other SeNB, e.g. the second network node 510, in the cluster that it is MeNB now. This may be done by transmitting the third signal S63 to the other SeNB. The other SeNB does not need to do anything except to configure its transport protocol to prepare to receive signaling/data from the new MeNB.

Fourthly, the new MeNB informs the CN that it is the MeNB now. This may be done by transmitting the fourth signal S64 to the CN. The CN then deliver packets to the new MeNB, e.g. the third network node 512.

Signaling Procedure for Guaranteeing System Availability

Figure 18:
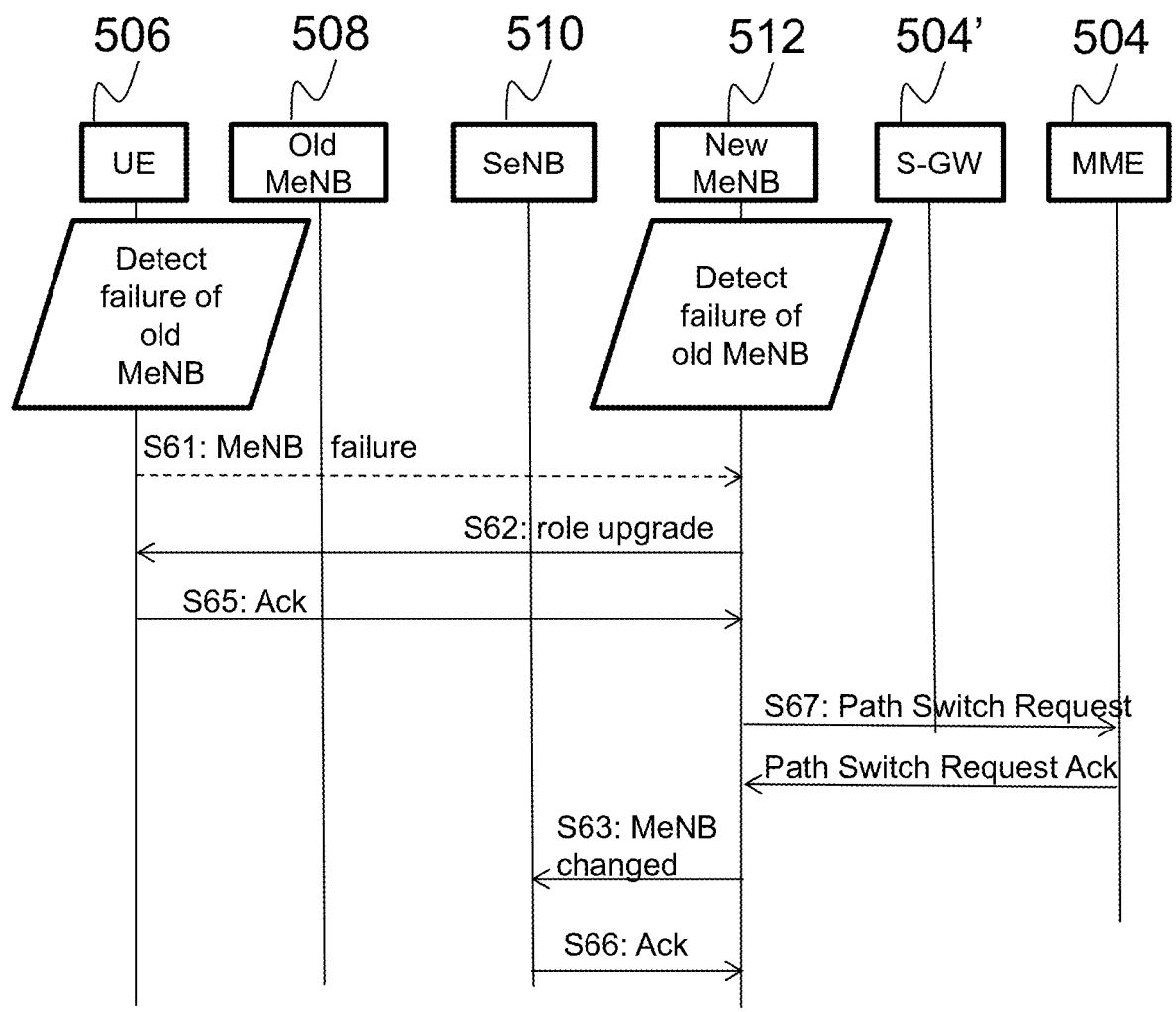
FIG. 18 schematically illustrates embodiments of the signaling procedure for change of master node a wireless device.

An exemplifying signaling procedure for guaranteeing system availability will now be described with reference to FIG. 18.

Consider the case that the current MeNB suddenly becomes unavailable i.e., out of service, and one of the SeNB needs to be upgraded to the MeNB role so as to guarantee the system availability target e.g., which is set by the mission-critical MTC services.

In order to have a fast SeNB role upgrade to MeNB, the second protocol architecture described above may be preferred. This is because that the SRB is already set up between the UE and each SeNB, the S-KeNB is known by both the UE and the SeNB, i.e., UE context including security is already there in the SeNB, and the UE and the SeNB is able communicate with each other directly without first going into the idle mode and then setting up the connection. An exemplifying signaling procedure is shown in FIG. 18. Since either the network or the UE can detect failure of the old MeNB, the first message to recover the cluster may be either initiated by the UE or by the network via new MeNB.

An exemplifying procedure will now be described.

Firstly, a master failure, e.g. a MeNB connection failure or a MeNB node failure, is detected by means of a missing alive signaling between the MeNB, e.g. the first network node 508, and the SeNB, e.g. the third network node 512, or by the UE reporting failure of MCG to the SeNB. After detecting failure of MCG, the UE sends RRC re-establishment request to the SeNB using the security key, e.g. the S-KeNB, via the SRB between itself and one of the SeNB with the cause value set to 'MeNB failure'. This may be done by transmitting the first signal S61 to the SeNB, e.g. the third network node 512. The SeNB can decode the RRC message using its S-KeNB. When notice that the cause value is 'MeNB failure', SeNB can perform step 2. This is different from normal RRC re-establishment which is preceded by RLF and random access, causing UE connection interruption. A signal may be transmitted from the MeNB, e.g. the first network node 508, to the SeNB, e.g. the third network node 512, in case it notices loss of connectivity with the UE, e.g. the wireless device 506.

Secondly, the SeNB, e.g. the third network node 512, performs necessary steps to acquire the MeNB role or the eNB role in case there is no other SeNB in the cluster. This may be done by the SeNB informing the UE, e.g. the wireless device 506, that it accepts the MeNB role, bu for example transmitting the second signal S62 to the wireless device 506. Further, since the SeNB, e.g. the third network node 512, has the SRB connection with the UE, the SeNB is able to send an RRC message to the UE directly using the security key, e.g. the S-KeNB. When the UE receives and deciphers this message, what UE needs to do is just to reconfigure its PDCP entity for split data bearer, and release resource corresponding to the old MeNB, e.g. the first network node 508. Other things is to be remained.

Secondly, the SeNB, e.g. the third network node 512, informs the other SeNB(s), e.g. the second network node 510, in the cluster that it is the new MeNB. This may be done by transmitting the third signal S63 to the second network node 510. The other SeNB does not need to do anything except for updating its transport layer to be prepared to receive from the new MeNB.

Thirdly, the SeNB, e.g. the third network node 512, informs the CN that it is the new MeNB. This may be done by transmitting the fourth signal S64 to the CN. The CN relocates the S1 connection from the old MeNB, e.g. the first network node 508, to the SeNB, e.g. the third network node 512. The CN then starts to deliver data to the new MeNB, e.g. the third network node 512. Further, the SeNB, e.g. the second network node 510, releases X2 connection with the old MeNB, e.g. the first network node 508. By means of this procedure, the SeNB, e.g., the third network node 512, is able be upgraded into a master node very quickly and enables mission-critical MTC use cases that require extreme latency, reliability and availability requirements.

It should be understood that, even more embodiments may be obtained by minor modifications of the embodiments disclosed herein.

When the word "comprise" or "comprising" is used in this disclosure it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A wireless communications system configured to change a master node for a wireless device comprising a processor, the wireless communication system comprising:
   a first network node comprising a first processor, a second network node comprising a second processor, and a third network node comprising a third processor, wherein the wireless device, the first network node, the second network node and the third network node are operating in the wireless communications system, wherein the first network node is connected to the wireless device as the master node for the wireless device, the master node being a signaling anchor point for the wireless device, wherein the second network node and the third network node are connected to the wireless device as secondary nodes for the wireless device and wherein the wireless communications system is configured to:
      receive a first signal using the third network node, which first signal comprises information that the third network node currently connected to the wireless device as a secondary node is to be the master node for the wireless device and information to the third network node to reuse a first set of existing protocol entities and context for communication with the wireless device;
      transmit, using one of the first network node and the third network node, a second signal to the wireless device, which second signal comprises information about a change of the master node from the first network node to the third network node and information to the wireless device to reuse a second set of existing protocol entities and context for communication with the third network node; and
      receive a third signal using the second network node, which third signal comprises information that the third network node is the master node for the wireless device and information to the second network node to reuse a third set of existing protocol entities and context for communication with the wireless device, whereby the master node for the wireless device is changed to the third network node.

2. A wireless device configured to change a master node for the wireless device, wherein the wireless device, a first network node comprising a first processor, a second network node comprising a second processor and a third network node comprising a third processor are operating in a wireless communications system, wherein the first network node is connected to the wireless device as the master node for the wireless device, wherein the second network node and the third network node are connected to the wireless device as secondary nodes for the wireless device, and wherein the wireless device comprises:
   an input/output interface configured to communicate with the wireless communication system; and
   a processor configured to,
      receive a signal through the input/output interface, which signal comprises information about a change of the master node from the first network node to the third network node currently connected to the wireless device as a secondary node and information to the wireless device to reuse a set of existing protocol entities and context for communication with the third network node; and reuse the set of existing protocol entities and context for communication with the third network as the master node.

3. The wireless device of claim 2, wherein the processor is further configured to:
transmit a first signal through the input/output interface to the third network node, which first signal comprises information that the third network node is to be the master node for the wireless device and information to the third network node to reuse a first set of existing protocol entities and context for communication with the wireless device.

4. The wireless device of claim 3, wherein the processor is further configured to:
receive a first acknowledgement signal from the third network node through the input/output interface, which first acknowledgement signal acknowledges receipt of the first signal.

5. The wireless device of claim 2, wherein the processor is further configured to:
receive the signal from the first network node or the third network node through the input/output interface.

6. The wireless device of claim 2, wherein the processor is further configured to:
transmit an acknowledgement signal to the third network node, which acknowledgement signal acknowledges receipt of the signal.

7. The wireless device of claim 2, wherein the set of existing protocol entities comprise one or more Radio Link Control, RLC, entities and/or one or more Medium Access Control, MAC, entities, and wherein the context comprises one or more of: state information such as a Radio Resource Control, RRC, state; security-related information such as a security capability or a key material; a UE identity such as an identity of a UE-associated logical S1-connection; and a UE radio access capability.

8. The wireless device of claim 2, wherein the processor is further configured to:
derive a security key to be used in a radio bearer between the wireless device and the third network node; and
configure a Packet Data Convergence Protocol, PDCP, entity for the radio bearer between the wireless device and the third network node.

9. A first network node configured to change a master node for a wireless device, wherein the wireless device comprising a first processor, the first network node, and a third network node comprising a second processor are operating in a wireless communications system, wherein the first network node is connected to the wireless device as the master node for the wireless device, wherein the third network node is connected to the wireless device as a secondary node for the wireless device, and wherein the first network node comprises:
an input/output interface configured to communicate with the wireless device and with the second network node and the third network node; and
a processor configured to:
transmit a first signal through the input/output interface to the third network node, which first signal comprises information that the third network node currently connected to the wireless device as a secondary node is to be the master node for the wireless device and information to the third network node to reuse a first set of existing protocol entities and context for communication with the wireless device; and transmit a second signal through the input/output interface to the wireless device, which second signal comprises information about a change of master node from the first network node to the third network node and information to the wireless device to reuse a second set of existing protocol entities and context for communication with the third network node, whereby the master node for the wireless device is changed to the third network node.

10. The first network node of claim 9, wherein the processor is further configured to:
receive a first acknowledgement signal from the third network node through the input/output interface, which first acknowledgement signal acknowledges receipt of the first signal.

11. The first network node of claim 9, wherein the first set of existing protocol entities and the second set of existing protocol entities comprise one or more Radio Link Control, RLC, entities and/or one or more Medium Access Control, MAC, entities, and wherein the context comprises one or more of: state information such as a Radio Resource Control, RRC, state; security-related information such as a security capability or a key material; a UE identity such as an identity of a UE-associated logical S1-connection; and a UE radio access capability.

12. The first network node of claim 9, wherein the processor is further configured to:
prepare to receive data from the third network node.

13. A third network node configured to change a master node for a wireless device comprising a first processor, wherein the wireless device, a first network node comprising a second processor, and a second network node comprising a third processor, and the third network node are operating in a wireless communications system, wherein the first network node is connected to the wireless device as the master node for the wireless device, wherein the second network node and the third network node are connected to the wireless device as secondary nodes for the wireless device; and wherein the third network node comprises:
an input/output interface configured to communicate with the wireless device and with the first and second network nodes; and
a processor configured to,
receive a first signal through the input/output interface, which first signal comprises information that the third network node currently connected to the wireless device as a secondary node is to be the master node for the wireless device and information to the third network node to reuse a first set of existing protocol entities and context for communication with the wireless device;
transmit a second signal through the input/output interface to the wireless device, which second signal comprises information about a change of master node from the first network node to the third network node and information to the wireless device to reuse a second set of existing protocol entities and context for communication with the third network node; and
transmit a third signal through the input/output interface to the second network node, which third signal comprises information that the third network node is the master node for the wireless device and information to the second network node to reuse a third set of existing protocol entities and context for communication with the wireless device, whereby the master node for the wireless device is changed to the third network node.

14. The third network node of claim 13, wherein the processor is further configured to:
receive the first signal from the first network node or the wireless device through the input/output interface.

15. The third network node of claim 13, wherein the processor is further configured to:
transmit a first acknowledgement signal through the input/output interface to the first network node or the wireless device, which first acknowledgement signal acknowledges receipt of the first signal.

16. The third network node of claim 13, wherein the processor is further configured to:
receive a second acknowledgement signal from the wireless device through the input/output interface, which second acknowledgement signal acknowledges receipt of the second signal.

17. The third network node of claim 13, wherein the processor is further configured to:
receive a third acknowledgement signal from the second network node through the input/output interface, which third acknowledgement signal acknowledges receipt of the third signal.

18. The third network node of claim 13, wherein the first set of existing protocol entities and the second set of existing protocol entities comprise one or more Radio Link Control, RLC, entities and/or one or more Medium Access Control, MAC, entities, and wherein the context comprises one or more of: state information such as a Radio Resource Controller, RRC, state; security-related information such as a security capability or a security key; a UE identity such as an identity of a UE-associated logical S1-connection; and a UE radio access capability.

19. The third network node of claim 13, wherein the processor is further configured to:
transmit a fourth signal through the input/output interface to a core network node, which fourth signal informs the core network node that the third network node is the master node for the wireless device.

20. A method performed by a wireless device to change a master node for the wireless device, wherein the wireless device comprising a first processor, a first network node comprising a second processor, a second network node comprising a third processor, and a third network node comprising a fourth processor are operating in a wireless communications system, wherein the first network node is connected to the wireless device as the master node for the wireless device, wherein the second network node and the third network node are connected to the wireless device as secondary nodes for the wireless device, and wherein the method comprises:
receiving a signal, which signal comprises information about a change of the master node from the first network node to the third network node currently connected to the wireless device as a secondary node and information to the wireless device to reuse a set of existing protocol entities and context for communication with the third network node; and
reuse the set of existing protocol entities and context for communication with the third network node as the master node.

21. A method performed by a first network node comprising a first processor to change a master node for a wireless device comprising a second processor, wherein the wireless device, the first network node, and a third network node comprising a third processor are operating in a wireless communications system, wherein the first network node is connected to the wireless device as the master node for the wireless device, wherein the third network node is connected to the wireless device as a secondary node for the wireless device, and wherein the method comprises:
transmitting a first signal to the third network node, which first signal comprises information that the third network node currently connected to the wireless device as a secondary node is to be the master node for the wireless device and information to the third network node to reuse a first set of existing protocol entities and context for communication with the wireless device; and
transmitting a second signal to the wireless device, which second signal comprises information about a change of master node from the first network node to the third network node and information to the wireless device to reuse a second set of existing protocol entities and context for communication with the third network node, whereby the master node for the wireless device is changed to the third network node.

22. A method performed by a third network node to change a master node for a wireless device, wherein the wireless device comprising a first processor, a first network node comprising a second processor, a second network node comprising a third processor and the third network node comprising a fourth processor are operating in a wireless communications system, wherein the first network node is connected to the wireless device as the master node for the wireless device, wherein the second network node and the third network node are connected to the wireless device as secondary nodes for the wireless device; and wherein the method comprises:
receiving a first signal, which first signal comprises information that the third network node currently connected to the wireless device as a secondary node is to be the master node for the wireless device and information to the third network node to reuse a first set of existing protocol entities and context for communication with the wireless device;
transmitting a second signal to the wireless device, which second signal comprises information about a change of master node from the first network node to the third network node and information to the wireless device to reuse a second set of existing protocol entities and context for communication with the third network node; and
transmitting a third signal to the second network node, which third signal comprises information that the third network node is the master node for the wireless device and information to the second network node to reuse a third set of existing protocol entities and context for communication with the wireless device, whereby the master node for the wireless device is changed to the third network node.

* * * * *